(12) United States Patent
Kang et al.

(10) Patent No.: US 11,082,625 B2
(45) Date of Patent: Aug. 3, 2021

(54) IMAGING SYSTEMS FOR GENERATING HDR IMAGES AND OPERATING METHODS THEREOF

(71) Applicant: Samsung Electronics Co., Ltd., Suwon-si (KR)

(72) Inventors: Hee Kang, Hwaseong-si (KR); Youngjun Song, Seoul (KR); Chanyoung Jang, Pohang-si (KR); Minkyu Sun, Suwon-si (KR); Junghoon Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/547,786

(22) Filed: Aug. 22, 2019

(65) Prior Publication Data

US 2020/0236273 A1 Jul. 23, 2020

(30) Foreign Application Priority Data

Jan. 18, 2019 (KR) .......................... 10-2019-0006857

(51) Int. Cl.
*H04N 5/235* (2006.01)
*H04N 5/265* (2006.01)
(Continued)

(52) U.S. Cl.
CPC ......... *H04N 5/2355* (2013.01); *G06T 3/4015* (2013.01); *G06T 7/20* (2013.01); *H04N 5/2353* (2013.01); *H04N 5/265* (2013.01); *H04N 9/0455* (2018.08); *G06T 5/007* (2013.01); *G06T 2207/20208* (2013.01)

(58) Field of Classification Search
None
See application file for complete search history.

(56) References Cited

U.S. PATENT DOCUMENTS 6,864,916 B1 3/2005 Nayar et al.
7,312,824 B2 12/2007 Taken et al.
(Continued)

FOREIGN PATENT DOCUMENTS

CN 104253983 A 12/2014
EP 02442556 A1 4/2012
(Continued)

*Primary Examiner* — Twyler L Haskins
*Assistant Examiner* — Wesley J Chiu
(74) *Attorney, Agent, or Firm* — Harness, Dickey & Pierce, P.L.C.

(57) ABSTRACT

An imaging system for generating a high dynamic range (HDR) image includes a pixel array that includes first pixels and second pixels, a driver circuit configured to control the first pixels based on a first exposure time and control the second pixels based on a second exposure time, an output circuit configured to output first pixel values of the first pixels and second pixel values of the second pixels from the pixel array, and a processing device configured to generate the HDR image based on a first Bayer image and a second Bayer image, where the first Bayer image is generated based on the first pixel values and the second Bayer image is generated based on the second pixel values and third pixel values of the first Bayer image. The quantity of pixels of the first pixels may be greater than the quantity of pixels of the second pixels.

16 Claims, 17 Drawing Sheets

(51) Int. Cl.
  *G06T 3/40*   (2006.01)
  *H04N 9/04*   (2006.01)
  *G06T 7/20*   (2017.01)
  *G06T 5/00*   (2006.01)

(56) References Cited

U.S. PATENT DOCUMENTS

| | | |
|---|---|---|
| 7,777,804 B2 | 8/2010 | Shan et al. |
| 7,825,969 B2 | 11/2010 | Tico et al. |
| 7,940,311 B2 | 5/2011 | Trimeche et al. |
| 7,999,858 B2 | 8/2011 | Nayar et al. |
| 8,022,994 B2 | 9/2011 | Luo et al. |
| 8,854,514 B1 | 10/2014 | Lee |
| 8,989,484 B2 | 3/2015 | Moon et al. |
| 9,040,892 B2 | 5/2015 | Smith |
| 9,071,765 B2 | 6/2015 | Motta |
| 9,189,837 B2 | 11/2015 | Park |
| 9,282,256 B1 | 3/2016 | Shan et al. |
| 9,338,372 B2 | 5/2016 | Cho et al. |
| 9,451,216 B2 | 9/2016 | Nobayashi |
| 9,467,633 B2 | 10/2016 | Johnson et al. |
| 9,626,750 B2 | 4/2017 | Hirai et al. |
| 9,635,333 B2 | 4/2017 | Cho et al. |
| 2008/0253758 A1* | 10/2008 | Yap ...................... H04N 5/2351 396/234 |
| 2009/0091645 A1* | 4/2009 | Trimeche ......... H04N 5/232933 348/273 |
| 2010/0201862 A1* | 8/2010 | Hatabu ............... H04N 5/35554 348/311 |
| 2012/0050557 A1* | 3/2012 | Atanassov ......... H04N 5/35581 348/222.1 |
| 2012/0218426 A1* | 8/2012 | Kaizu ................ H04N 5/35554 348/208.4 |
| 2012/0281111 A1* | 11/2012 | Jo .......................... H04N 9/045 348/229.1 |
| 2014/0111675 A1* | 4/2014 | Tatsuzawa ......... H04N 5/35554 348/302 |
| 2014/0184894 A1* | 7/2014 | Motta .................... H04N 9/045 348/362 |
| 2014/0340553 A1* | 11/2014 | Kuang ............... H04N 5/35563 348/302 |
| 2015/0244916 A1* | 8/2015 | Kang ................... H04N 5/2355 348/222.1 |
| 2016/0142645 A1* | 5/2016 | Shionoya ................ H04N 5/379 348/218.1 |
| 2017/0013217 A1* | 1/2017 | Lee ........................ H04N 5/37457 |
| 2017/0041542 A1* | 2/2017 | Ono ....................... H04N 9/045 |
| 2017/0103497 A1* | 4/2017 | Cao ................... H04N 5/35554 |
| 2017/0104910 A1 | 4/2017 | Kimura et al. |
| 2018/0041724 A1 | 2/2018 | Kim et al. |

FOREIGN PATENT DOCUMENTS

| | | |
|---|---|---|
| EP | 03270583 A1 | 1/2018 |
| JP | 5411786 B2 | 2/2014 |
| KR | 101477505 B1 | 1/2015 |

* cited by examiner

IMAGING SYSTEMS FOR GENERATING HDR IMAGES AND OPERATING METHODS THEREOF

CROSS-REFERENCE TO RELATED APPLICATIONS

This application claims priority under 35 U.S.C. § 119 to Korean Patent Application No. 10-2019-0006857 filed on Jan. 18, 2019, in the Korean Intellectual Property Office, the disclosure of which is incorporated by reference herein in its entirety.

BACKGROUND

Example embodiments of the inventive concepts described herein relate to imaging systems, and more particularly, relate to imaging systems for generating high dynamic range (HDR) images and operating methods thereof.

An imaging system is a system configured to provide an image captured from a camera to a user. The imaging system may include the camera, such that the imaging system may capture an image and provide the captured image to a user. Imaging systems may be implemented in various types of electronic devices, including smartphones. To provide a high-quality image to the user, an imaging system may increase (e.g., make better, improve, or the like) a dynamic range of an image. The dynamic range means a range capable of expressing illumination from a dark portion to a bright portion in an image. An image, the dynamic range of which is improved, is called an "HDR image".

An imaging system may generate an HDR image by capturing and combining images corresponding to different exposure times to generate a single image. However, in the case where an object moves while images, of the object and corresponding to different exposure times, are captured, artifacts may occur in the resulting HDR image. In some example embodiments, a resolution of an image of an object may decrease in the process of generating the HDR image of the object.

SUMMARY

Some example embodiments of the inventive concepts provide imaging systems that may generate HDR images in which artifacts are reduced or minimized even though an objects in the generated HDR images are in motion and operating methods thereof.

Some example embodiments of the inventive concepts provide imaging systems that may generate HDR images having a high resolution and operating methods thereof.

According to some example embodiments, an imaging system may include a pixel array including a plurality of first pixels and a plurality of second pixels, driver circuitry configured to control the plurality of first pixels based on a first exposure time and control the plurality of second pixels based on a second exposure time, output circuitry configured to output first pixel values of the plurality of first pixels and second pixel values of the plurality of second pixels from the pixel array, and processing circuitry configured to generate a high dynamic range (HDR) image based on a first Bayer image and a second Bayer image. The first Bayer image may be generated based on the first pixel values. The second Bayer image may be generated based on both the second pixel values and third pixel values of the first Bayer image. A quantity of pixels of the first pixels may be greater than a quantity of pixels of the second pixels.

According to some example embodiments, an imaging system may include an image sensor including a plurality of first pixels and a plurality of second pixels. The image sensor may be configured to generate image data associated with one frame of an image based on the plurality of first pixels being controlled during a first exposure time and the plurality of second pixels being controlled during a second exposure time. The image data may include first pixel values of the plurality of first pixels and second pixel values of the plurality of second pixels. The imaging system may include image signal processing circuitry configured to generate an HDR image based on a first Bayer image and a second Bayer image. The first Bayer image may be generated based on the first pixel values. The second Bayer image may be generated based on both the second pixel values and third pixel values of the first Bayer image. A quantity of pixels of the first pixels may be greater than a quantity of pixels of the second pixels.

According to some example embodiments, an operating method of an imaging system, where the imaging system includes an image sensor including a plurality of first pixels and a plurality of second pixels, may include generating image data associated with one frame of an image based on the plurality of first pixels being controlled during a first exposure time and the plurality of second pixels being controlled during a second exposure time, the image data including first pixel values of the plurality of first pixels and second pixel values of the plurality of second pixels, generating a first Bayer image based on the first pixel values of the first pixels of the image data, generating a second Bayer image based on the second pixel values of the second pixels of the image data and third pixel values of the first Bayer image, and generating an HDR image based on the first Bayer image and the second Bayer image. A quantity of pixels of the first pixels may be greater than a quantity of pixels of the second pixels.

BRIEF DESCRIPTION OF THE DRAWINGS

The above and other objects and features of the inventive concepts will become apparent by describing in detail some example embodiments thereof with reference to the accompanying drawings.

DETAILED DESCRIPTION

Below, embodiments of the inventive concepts may be described in detail and clearly to such an extent that an ordinary one in the art easily implements the inventive concepts.

Figure 1:
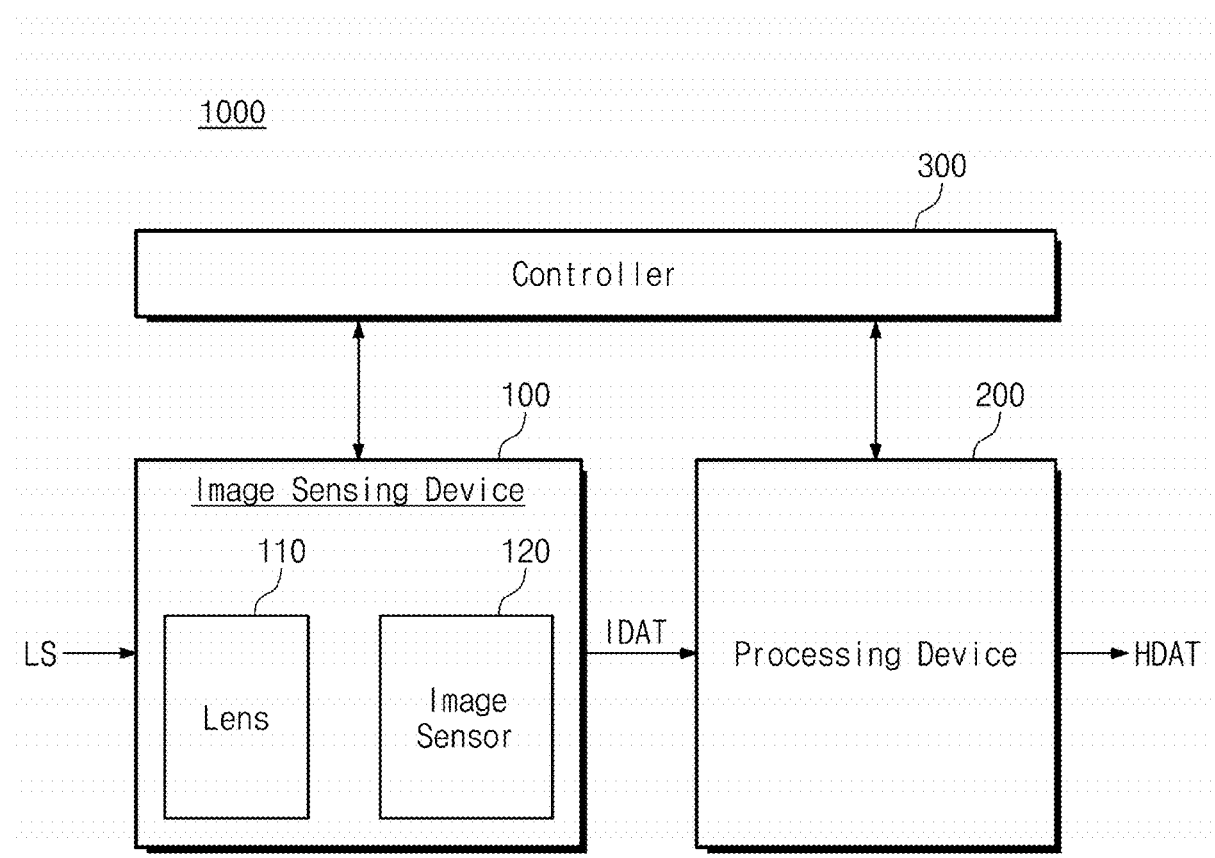
FIG. 1 is a block diagram illustrating an imaging system according to some example embodiments of the inventive concepts.

FIG. 1 is a block diagram illustrating an imaging system 1000 according to some example embodiments of the inventive concepts. The imaging system 1000 may be implemented on various types of electronic devices or electronic circuits. For example, the imaging system 1000 may be implemented with a desktop computer, a laptop computer, a tablet computer, a smartphone, a wearable device, an electric vehicle, an integrated circuit (IC), a system on chip (SoC), a digital signal processor (DSP), etc. However, the inventive concepts are not limited thereto. For example, the imaging system 1000 may be implemented with any kind of device or circuit that captures and processes an image.

Referring to FIG. 1, the imaging system 1000 may include an image sensing device 100, a processing device 200, and a controller 300. The image sensing device 100, the processing device 200, and the controller 300 may be integrated in and/or implemented with one chip or may be implemented with separate chips, respectively.

The image sensing device 100 may include a lens 110 and an image sensor 120. The lens 110 may receive a light signal LS reflected from an object present in a specific frame. The lens 110 may provide the received light signal LS to the image sensor 120.

The image sensor 120 may output image data IDAT based on the light signal LS. The image sensor 120 may include a plurality of pixels. The light signal LS may be converted to an electrical signal through the pixels. The image data IDAT may be a digital signal that is based on the electrical signal converted from the light signal LS. The image data IDAT may include image information including, but not limited to, brightness information and color information of a specific frame. The image data IDAT may be provided to the processing device 200. Also, the image data IDAT may be provided to the controller 300.

The processing device 200 may process the image data IDAT to generate an HDR image HDAT. A resolution of the HDR image HDAT may be the same as a resolution of the image sensor 120. As such, the processing device 200 may generate an HDR image of a high resolution. Afterwards, the HDR image HDAT may be post-processed and may then be provided to a user through a display device. For example, lens shading correction, white balance correction, noise reduction, sharpening, gamma correction, color conversion, etc. may be performed on the HDR image HDAT. The above post-processing operations may be performed by the processing device 200 or may be performed by a separate processing device. The processing device 200, which may also be referred to as "processing circuitry", may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The controller 300 may control operations of the image sensing device 100 and the processing device 200. In some example embodiments, the controller 300 may control an exposure time of pixels included in the image sensor 120. The controller 300 may determine an exposure time of each pixel based on a plurality of exposure times. The image sensor 120 may operate the pixels based on the determined exposure times. For example, a part of the pixels may be driven during a long exposure time, and the rest thereof may be driven during a short exposure time. In some example embodiments, the image data IDAT generated by the image sensor 120 may include a pixel value of relatively high luminance and a pixel value of relatively low luminance. The processing device 200 may generate the HDR image HDAT of an improved dynamic range from the image data IDAT generated based on a plurality of exposure times. The controller 300, which may also be referred to as "controller circuitry", may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

As described above, the imaging system 1000 according to some example embodiments of the inventive concepts may generate the HDR image HDAT by obtaining the image data IDAT for one frame based on a plurality of exposure times and processing the image data IDAT. The probability that an object moves while one frame is captured may be lower than the probability that an object moves while a plurality of frames are captured. As such, in the case of generating the HDR image HDAT based on a result of obtaining the image data IDAT of a plurality of frames, the probability that artifacts due to a movement of an object occur may become higher. The imaging system 1000 according to some example embodiments of the inventive concepts may generate the HDR image HDAT based on one frame, and thus, the probability of occurrence of artifacts due to a movement of an object may decrease compared with the case of generating the HDR image HDAT based on a plurality of frames.

Figure 2:
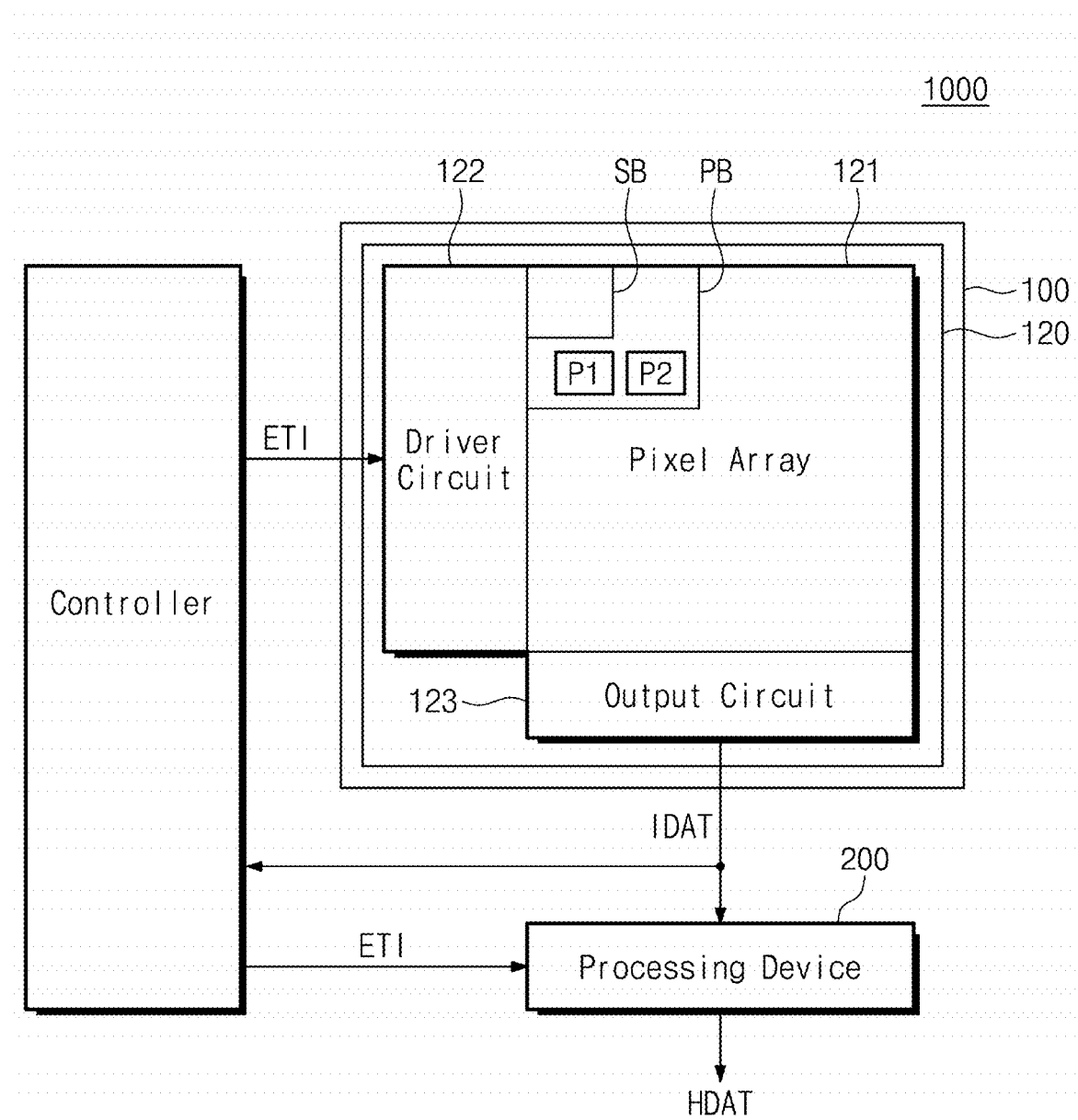
FIG. 2 is a block diagram illustrating an imaging system of FIG. 1 in detail.

FIG. 2 is a block diagram illustrating the imaging system 1000 of FIG. 1 in detail. Referring to FIG. 2, the imaging system 1000 may include an image sensor 120 that includes a pixel array 121, a driver circuit 122, also referred to herein as "driver circuitry", an output circuit 123, also referred to herein as "output circuitry", the processing device 200, also referred to herein as "processing circuitry", and the controller 300. The pixel array 121, the driver circuit 122, and the output circuit 123 may be included in the image sensor 120 of FIG. 1.

The pixel array 121 may include a plurality of pixels arranged in a matrix form of a plurality of rows and a plurality of columns. Each pixel may generate an electrical signal (e.g., an analog signal) based on the light signal LS. To generate a color image, each pixel may be combined with one of a red (R) filter, a green (G) filter, and a blue (B) filter. The R, G, and B color filters may be arranged in the pixel array 121 depending on a specific pattern (i.e., a pattern of a color filter array (CFA)). As such, an electrical signal generated from each pixel may include a color value corresponding to the color filter of each pixel.

The pixel array 121 may include a plurality of pixel blocks PB. Each of the pixel blocks PB may include a plurality of pixels. For example, one pixel block PB may include a first pixel P1 and a second pixel P2, and a pixel array that includes multiple pixel blocks PB may thus include a plurality of first pixels P1 and a plurality of second pixels P2, where separate first pixels P1 may be included in separate pixel blocks PB and separate second pixels P2 may be included in separate pixel blocks PB. Each of the pixel blocks PB may have a specific CFA pattern. Since each pixel block PB has a specific CFA pattern, the pixel array 121 including the plurality of pixel blocks PB may have repeated CFA patterns. Example CFA patterns of the pixel block PB will be described with reference to FIGS. 3A to 3C.

The pixel block PB may include a sub-block SB including one or more pixels. The sub-block SB may include pixels corresponding to the same color being one of "R", "G", and "B". That is, color filters having the same color may be positioned in pixels of the sub-block SB. For example, at least two adjacent color filters corresponding to one sub-block SB may be configured to selectively transmit light having the same color, where the same color is one of a red color, a green color, or a blue color.

The driver circuit 122 may control the pixels of the pixel array 121. To control the pixels, the driver circuit 122 may generate a control signal. For example, the driver circuit 122 may control the pixels of the pixel array 121 in the unit of a row. The pixels may operate in response to the control signal. The driver circuit 122, which may also be referred to as "driver circuitry", may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The output circuit 123 may convert an analog signal output from the pixel array 121 to a digital signal. The analog signal may be output from the pixel array 121 in the unit of a column. The output circuit 123 may perform correlated double sampling (CDS) for the purpose of extracting an effective signal component. The output circuit 123 may convert an analog signal experiencing the CDS to a digital signal. In some example embodiments, the output circuit 123 may perform the CDS on a digital signal. As such, the output circuit 123 may output the image data IDAT in the form of a digital signal. The image data IDAT may be provided to the processing device 200 and the controller 300. The output circuit 123, which may be referred to as "output circuitry", may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The controller 300 may determine exposure time information ETI with regard to the respective pixels of the pixel array 121. The controller 300 may determine the exposure time information ETI based on a plurality of exposure times. The plurality of exposure times may include two or more different exposure times. For example, the controller 300 may determine the exposure time information ETI of the one or more first pixels P1 of the pixel array 121 as a first exposure time and may determine the exposure time information ETI of the one or more second pixels P2 of the pixel array 121 as a second exposure time. In some example embodiments, the first exposure time may be longer than the second exposure time. In some example embodiments, the first exposure time may be shorter than the second exposure time.

The controller 300 may determine the exposure time information ETI such that the number of pixels varies with an exposure time. For example, the controller 300 may determine the exposure time information ETI such that the number of pixels corresponding to the first exposure time is more than the number of pixels corresponding to the second exposure time.

The controller 300 may determine the exposure time information ETI to allow a pixel block PB or a sub-block SB to have a given exposure pattern. Here, the exposure pattern means a pattern formed according to an exposure time corresponding to each pixel. In the case where a given exposure pattern is formed in the unit of a pixel block PB, the pixel array 121 may have an exposure pattern repeated according to the exposure pattern of the pixel block PB. In the case where a given exposure pattern is formed in the unit of a sub-block SB, the pixel array 121 may have an exposure pattern repeated according to the exposure pattern of the sub-block SB. For example, in the case where an exposure pattern is formed in the unit of a pixel block PB, the first pixel P1 may correspond to the first exposure time, and the second pixel P2 may correspond to the second exposure time. Example exposure patterns will be described with reference to FIGS. 4A to 4C.

The controller 300 may determine the exposure time information ETI for the purpose of adjusting a dynamic range of the HDR image HDAT. For example, to increase a dynamic range, the controller 300 may further increase a relatively long exposure time or may further decrease a relatively short exposure time. In some example embodiments, the controller 300 may determine the exposure time information ETI based on the image data IDAT, which may include pixel values, output (e.g., transmitted) from the output circuit 123. For example, the controller 300 may determine the exposure time information ETI based on a dynamic range calculated from the image data IDAT. The exposure time information ETI may be provided to the driver circuit 122 and the processing device 200.

The driver circuit 122 may control the respective pixels of the pixel array 121 based on the exposure time information ETI. For example, in the case where the exposure time information ETI of the first pixel P1 corresponds to the first exposure time, the driver circuit 122 may control the first pixel P1 such that the first pixel P1 operates during the first exposure time. For example, in the case where the exposure time information ETI of the second pixel P2 corresponds to the second exposure time, the driver circuit 122 may control the second pixel P2 such that the second pixel P2 operates during the second exposure time. For example, in the case where the exposure time information ETI of a plurality of first pixels P1 corresponds to the first exposure time and the exposure time information ETI of a plurality of second pixels P2 corresponds to the second exposure time, the driver circuit 122 may control the first pixels P1 based on the first exposure time, for example such that the first pixels P1 operate during the first exposure time, and may control the second pixels P2 based on the second exposure time, for example such that the second pixels P2 operate during the second exposure time, where the first and second exposure times may be same, partially different, or entirely different exposure times. For example, the driver circuit 122 may control transistors included in the respective pixels based on the exposure time information ETI. In detail, the driver circuit 122 may adjust an on/off time of a transfer gate of each pixel based on the exposure time information ETI. As such, each pixel may operate based on the exposure time information ETI.

The image data IDAT output from the output circuit 123 may be obtained based on a plurality of exposure times. For example, a portion of the image data IDAT may be obtained from pixels corresponding to the first exposure time (e.g., the first pixels P1), and the rest may be obtained from pixels corresponding to the second exposure time (e.g., the second pixels P2). For example, the output circuit 123 may output image data IDAT that includes first pixel values of the first pixels P1 and second pixel values of the second pixels P2 from the pixel array 121. In some example embodiments, the number ("quantity") of pixels corresponding to the first exposure time may be different from the number ("quantity") of pixels corresponding to the second exposure time. For example, a quantity of pixels of the first pixels P1 may be greater than a quantity of pixels of the second pixels P2.

The processing device 200, which may be implemented by one or more instances of processing circuitry (e.g., an operation processing device/circuit) may process the image data IDAT based on the exposure time information ETI and may generate the HDR image HDAT. In some example embodiments, the processing device 200 may separate the image data IDAT based on an exposure time. For example, the image data IDAT may include pixel values corresponding to the first exposure time (e.g., first pixel values of first pixels P1), and pixel values corresponding to the second exposure time (e.g., second pixel values of second pixels P2). The processing device 200 may separate pixel values obtained by using the first exposure time and pixel values obtained by using the second exposure time. The processing device 200 may generate the HDR image HDAT by using the pixel values thus separated. How to generate the HDR image HDAT will be described with reference to FIGS. 6 to 12.

Figure 3A:
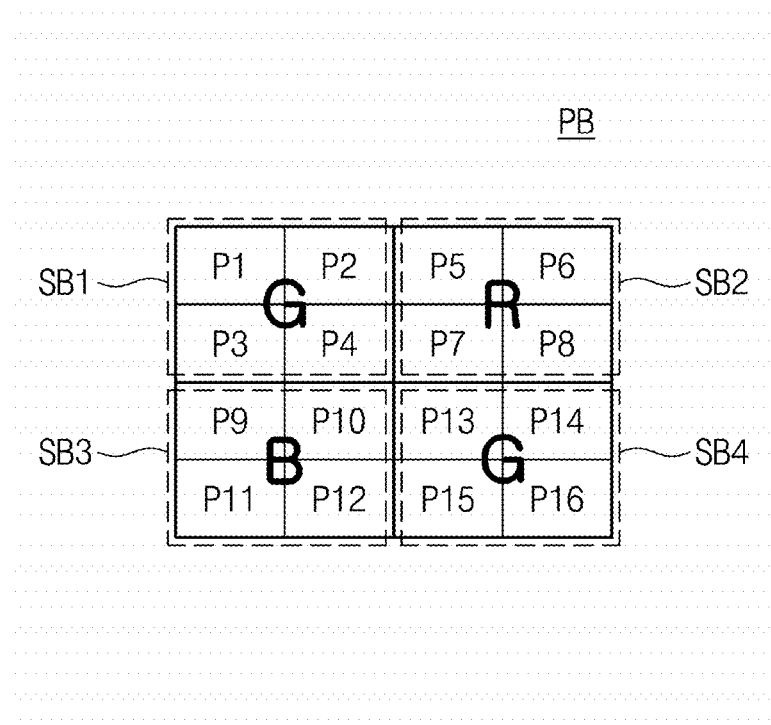
FIGS. 3A, 3B, and 3C are diagrams illustrating example color filter array patterns according to some example embodiments of the inventive concepts.
Figure 3B:
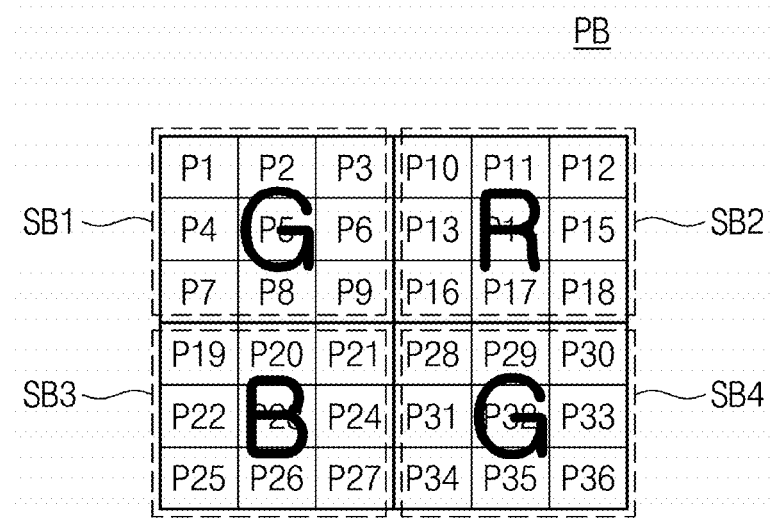
Figure 3C:
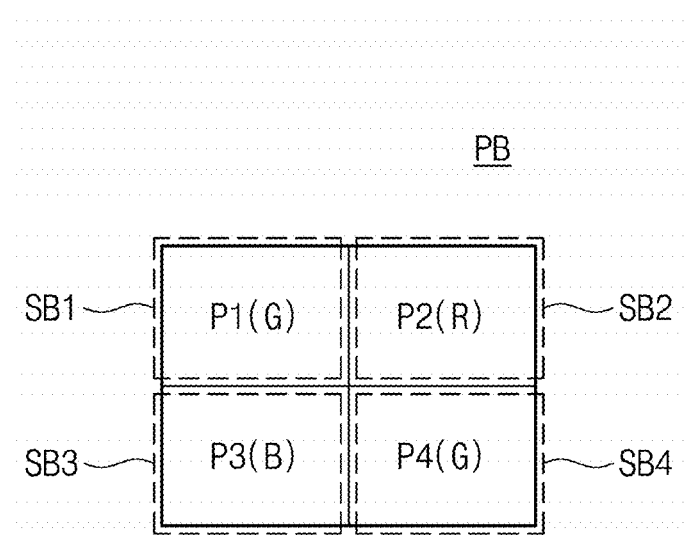

FIGS. 3A, 3B, and 3C are diagrams illustrating example CFA patterns according to some example embodiments of the inventive concepts. Referring to FIG. 3A, a pixel block PB may include first to fourth sub-blocks SB1 to SB4. Each of the first to fourth sub-blocks SB1 to SB4 may include four pixels. For example, the first sub-block SB1 may include first to fourth pixels P1 to P4. The pixel block PB may have a specific CFA pattern. The first sub-block SB1 and the fourth sub-block SB4 may correspond to a green color, the second sub-block SB2 may correspond to a red color, and the third sub-block SB3 may correspond to a blue color.

Referring to FIG. 3B, the pixel block PB may include the first to fourth sub-blocks SB1 to SB4. Each of the first to fourth sub-blocks SB1 to SB4 may include nine pixels. For example, the first sub-block SB1 may include first to ninth pixels P1 to P9. The pixel block PB may have a specific CFA pattern. The first sub-block SB1 and the fourth sub-block SB4 may correspond to a green color, the second sub-block SB2 may correspond to a red color, and the third sub-block SB3 may correspond to a blue color.

Referring to FIG. 3C, the pixel block PB may include the first to fourth sub-blocks SB1 to SB4. Each of the first to fourth sub-blocks SB1 to SB4 may include one pixel. For example, the first sub-block SB1 may include a first pixel P1. The pixel block PB may have a specific CFA pattern. The first sub-block SB1 and the fourth sub-block SB4 may correspond to a green color, the second sub-block SB2 may correspond to a red color, and the third sub-block SB3 may correspond to a blue color. A CFA pattern of FIG. 3C may be a Bayer pattern.

According to the CFA patterns of FIGS. 3A to 3C, the number of pixels corresponding to the green color, the number of pixels corresponding to the red color, and the number of pixels corresponding to the blue color may be 50%, 25%, and 25% of all pixels, respectively. However, the inventive concepts are not limited thereto. For example, percentages of pixels corresponding to the green color, the red color, and the blue color may be variable.

FIG. 3A shows an example where four pixels correspond to the same color, and FIG. 3B shows an example where nine pixels correspond to the same color. However, the inventive concepts are not limited thereto. For example, the number of pixels included in the pixel block PB may be variously changed, and the number of pixels included in the sub-block SB corresponding to the same color may be variously changed.

As described above, in the CFA pattern according to some example embodiments of the inventive concepts, a plurality of pixels corresponding to the same color may be formed adjacent to each other as illustrated in FIGS. 3A and 3B, or pixels corresponding to different colors may be formed alternately as illustrated in FIG. 3C.

Figure 4A:
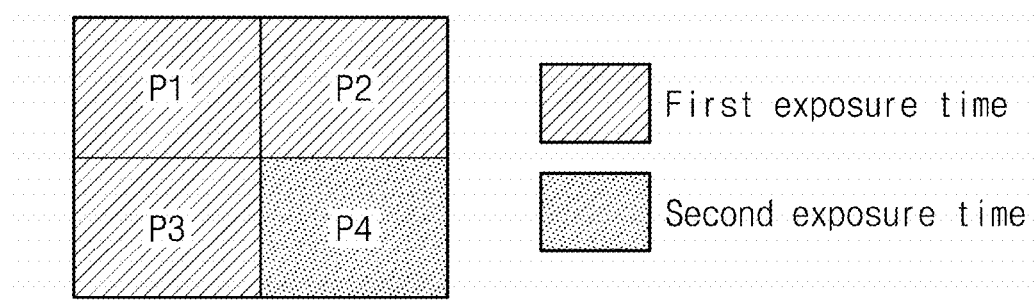
FIGS. 4A, 4B, and 4C illustrate example exposure patterns according to some example embodiments of the inventive concepts.
Figure 4B:
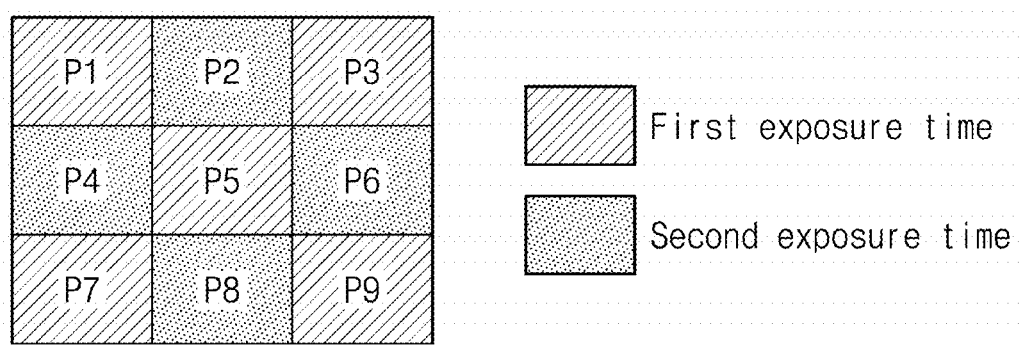
Figure 4C:
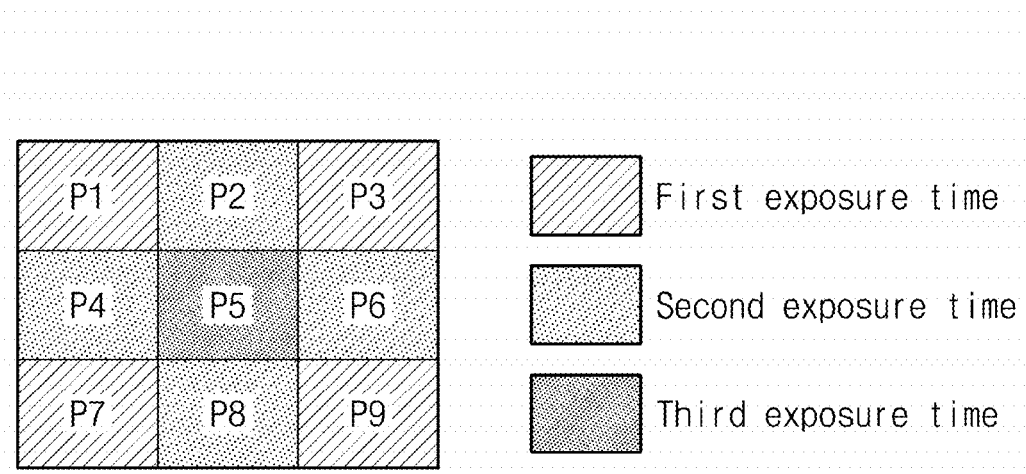

FIGS. 4A, 4B, and 4C illustrate example exposure patterns according to some example embodiments of the inventive concepts. Exposure patterns illustrated in FIGS. 4A to 4C are only examples, and the inventive concepts are not limited thereto. That is, the pixel array 121 may have various exposure patterns not illustrated in FIGS. 4A to 4C.

Referring to FIG. 4A, four pixels P1 to P4 may form one exposure pattern. The first to third pixels P1 to P3 may correspond to the first exposure time, and the fourth pixel P4 may correspond to the second exposure time. That is, an exposure pattern may be formed based on two exposure times. For example, the first exposure time may be longer than the second exposure time. The number of pixels (e.g., P1 to P3) corresponding to the first exposure time may be more than the number of pixels (e.g., P4) corresponding to the second exposure time. For example, the sub-block SB of FIG. 3A or the pixel block PB of FIG. 3C may have the exposure pattern of FIG. 4A.

Referring to FIG. 4B, nine pixels P1 to P9 may form one exposure pattern. The first pixel P1, the third pixel P3, the fifth pixel P5, the seventh pixel P7, and the ninth pixel P9 may correspond to the first exposure time, and the second pixel P2, the fourth pixel P4, the sixth pixel P6, and the eighth pixel P8 may correspond to the second exposure time.

The number of pixels corresponding to the first exposure time may be more than the number of pixels corresponding to the second exposure time. For example, the sub-block SB of FIG. 3B may have the exposure pattern of FIG. 4B.

Referring to FIG. 4C, nine pixels P1 to P9 may form one exposure pattern. The first pixel P1, the third pixel P3, the seventh pixel P7, and the ninth pixel P9 may correspond to the first exposure time; the second pixel P2, the fourth pixel P4, the sixth pixel P6, and the eighth pixel P8 may correspond to the second exposure time; and, the fifth pixel P5 may correspond to a third exposure time. That is, an exposure pattern may be formed based on three exposure times. For example, an exposure time may become short in the order of the first exposure time, the second exposure time, and the third exposure time. The number of pixels corresponding to the first exposure time and the number of pixels corresponding to the second exposure time may be more than the number of pixels corresponding to the third exposure time. For example, the sub-block SB of FIG. 3B may have the exposure pattern of FIG. 4C.

As described above, it may be understood from the above exposure patterns according to some example embodiments of the inventive concepts that the number of pixels is differently set according to an exposure pattern. That is, pixel counts corresponding to respective exposure times may be different from each other.

Exposure times according to two exposure times or three exposure times are illustrated in FIGS. 4A to 4C, but the inventive concepts are not limited thereto. That is, an exposure pattern may be formed based on four or more exposure times.

Figure 5A:
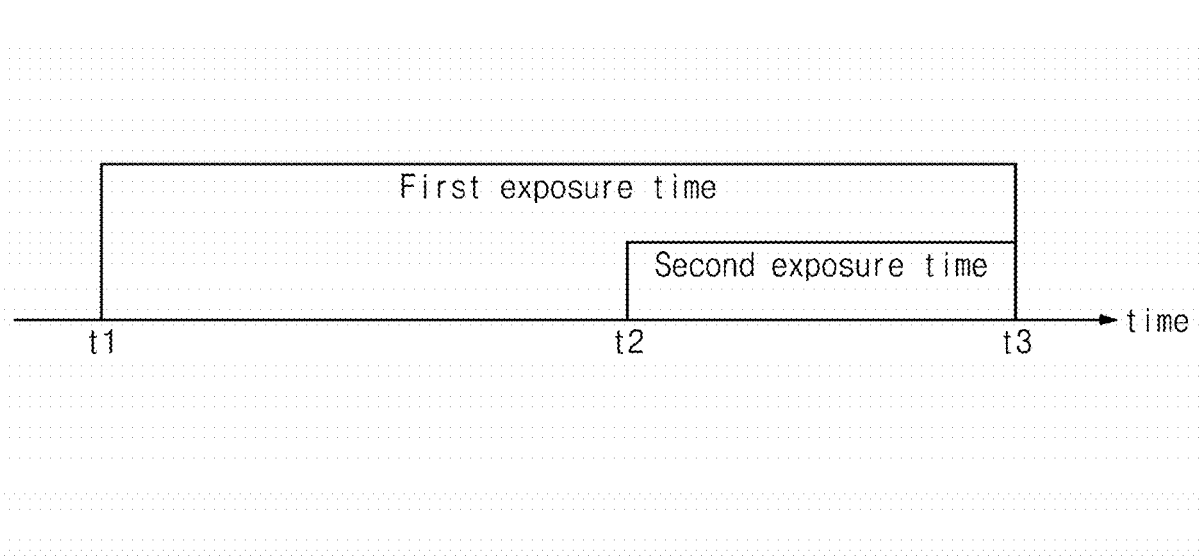
FIGS. 5A and 5B illustrate examples in which an imaging system of FIG. 2 controls pixels based on exposure times according to some example embodiments of the inventive concepts.
Figure 5B:
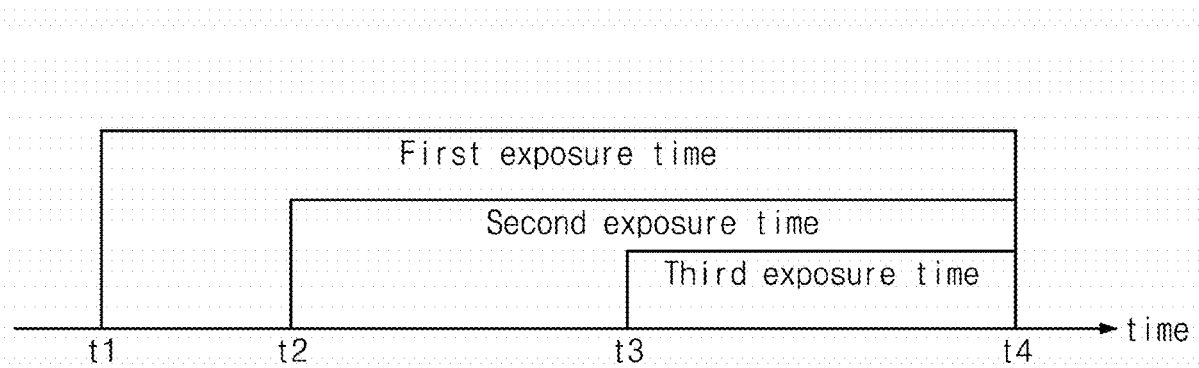

FIGS. 5A and 5B illustrate examples in which the imaging system 1000 of FIG. 2 controls pixels based on exposure times according to some example embodiments of the inventive concepts. Referring to FIGS. 2 and 5A, the driver circuit 122 may control pixels based on the first exposure time and the second exposure time shorter than the first exposure time. The driver circuit 122 may control pixels corresponding to the first exposure time from a first time t1 to a third time t3, and may control pixels corresponding to the second exposure time from a second time t2 to the third time t3. For example, the driver circuit 122 may control an on/off time of a transfer gate in each of pixels corresponding to the first exposure time, based on the first time t1 and the third time t3. Accordingly, it will be understood that an image sensor 120 that includes first pixels P1 and second pixels P2 may generate image data IDAT associated with one frame of an image based on the first pixels P1 being controlled during a first exposure time and the second pixels P2 being controlled during a second exposure time.

Referring to FIGS. 2 and 5B, the driver circuit 122 may control pixels based on the first exposure time, the second exposure time shorter than the first exposure time, and the third exposure time shorter than the second exposure time. The driver circuit 122 may control pixels corresponding to the first exposure time from a first time t1 to a fourth time t4, may control pixels corresponding to the second exposure time from a second time t2 to the fourth time t4, and may control pixels corresponding to the third exposure time from a third time t3 to the fourth time t4. For example, the driver circuit 122 may control an on/off time of a transfer gate in each of pixels corresponding to the first exposure time, based on the first time t1 and the fourth time t4.

As illustrated in FIGS. 5A and 5B, the driver circuit 122 may make exposure times of pixels different by controlling an on/off time of a transfer gate of each pixel. In some example embodiments, the driver circuit 122 may control pixels such that off times of transfer gates in the pixels are fixed. However, the inventive concepts are not limited thereto. For example, the driver circuit 122 may make exposure times of pixels different by controlling an on/off time of a transfer gate of each pixel differently.

Below, an operation in which the processing device 200 of FIG. 2 generates the HDR image HDAT will be described with reference to FIGS. 6 to 12. For convenience of description, as illustrated in FIG. 4A or 4B, it is assumed that the processing device 200 generates the HDR image HDAT based on the image data IDAT obtained by using two exposure times or three exposure times. However, the inventive concepts are not limited thereto. For example, the processing device 200 may generate the HDR image HDAT based on the image data IDAT obtained by using four or more exposure times.

Figure 6:
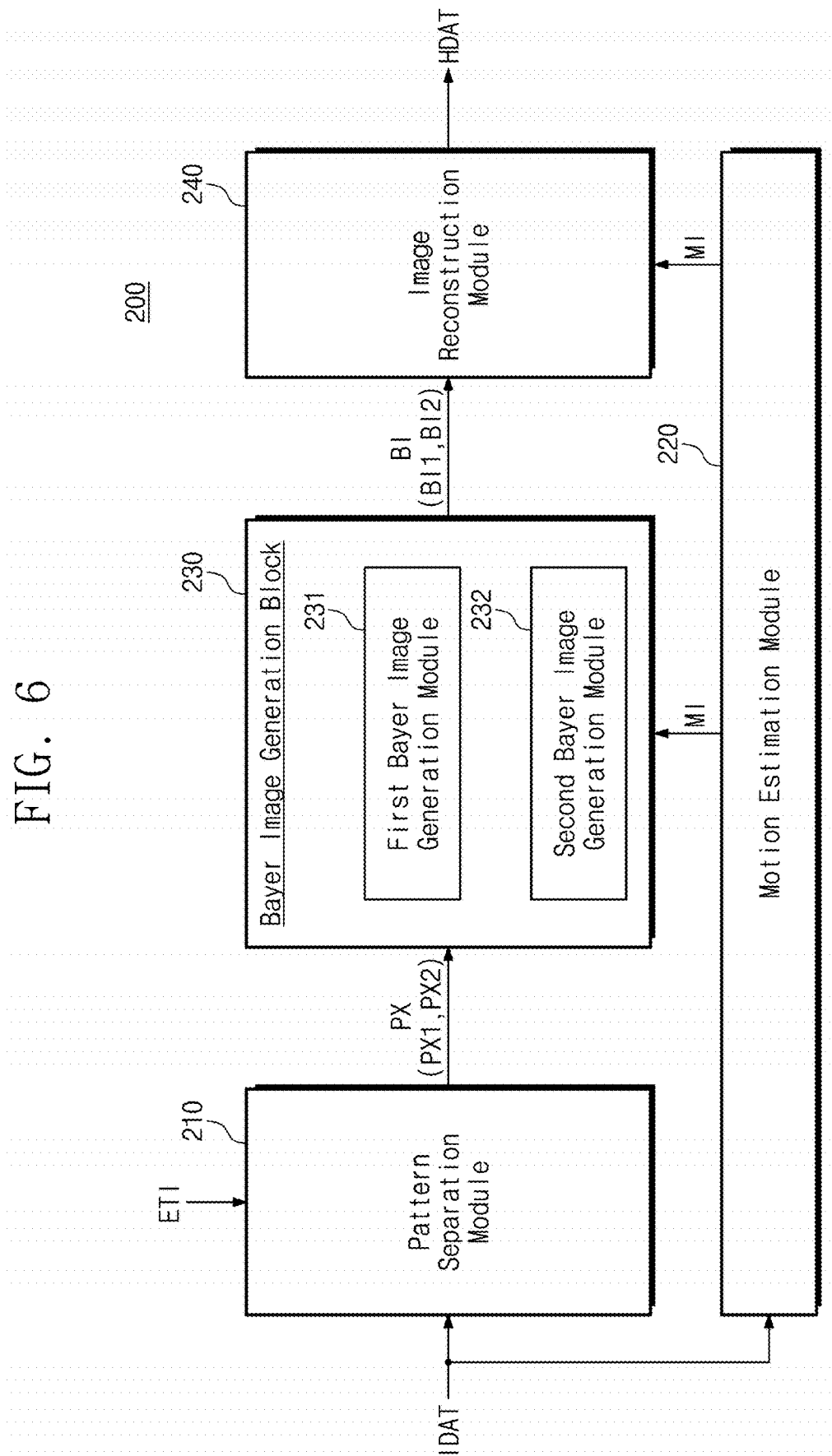
FIG. 6 is a block diagram illustrating one example of a processing device of FIG. 2.

FIG. 6 is a block diagram illustrating one example of the processing device 200 of FIG. 2. In detail, FIG. 6 shows the processing device 200 that generates the HDR image HDAT based on the image data IDAT obtained by using two exposure times. Referring to FIG. 6, the processing device 200 may include a pattern separation module 210, a motion estimation module 220, a Bayer image generation block 230, and an image reconstruction module 240. The Bayer image generation block 230 may include a first Bayer image generation module 231 and a second Bayer image generation module 232.

Each module of the processing device 200 may be implemented in the form of software, hardware, or a combination thereof. For example, the software may be a machine code, firmware, an embedded code, and application software. For example, the hardware may include an electrical circuit, an electronic circuit, a processor, an integrated circuit, integrated circuit cores, a microelectromechanical system (MEMS), or a combination thereof. For example, the processing circuitry that implement the processing device 200, including processing circuitry such as hardware including logic circuits; a hardware/software combination such as a processor executing software; or a combination thereof, may furthermore implement each module of the processing device 200.

The pattern separation module 210 may separate the image data IDAT based on the exposure time information ETI for each pixel. The pattern separation module 210 may separate pixel values corresponding to the same exposure time from the image data IDAT. For example, the pattern separation module 210 may separate first pixel values PX1 corresponding to the first exposure time (e.g., first pixel values PX1 of first pixels P1) and second pixel values PX2 corresponding to the second exposure time (e.g., second pixel values PX2 of second pixels P2). Accordingly, it will be understood that the pattern separation module 210, which may be implemented by the processing device 200, may separate the first pixel values PX1 and the second pixel values PX2 (to establish separated first pixel values and separated second pixel values, respectively) based on exposure time information ETI associated with the pixel array 121. In some example embodiments, the number of pixels corresponding to the first pixel values PX1 may be more than the number of pixels corresponding to the second pixel values PX2. The separated pixel values PX may be provided to the Bayer image generation block 230.

The motion estimation module 220 may estimate motion information MI associated with an object imaged in an image captured by the pixel array 121 based on the image data IDAT. The object may be an object that is visible in the image data IDAT. The motion information MI may indicate a magnitude of a movement of an object on a frame while the image data IDAT for one frame are obtained. For example, a value of the motion information MI when the movement of the object is large may be larger than a value of the motion information MI when the movement of the object is small. The magnitude of the movement of the object may vary with an area (or a pixel) of an image. For example, the motion estimation module 220 may compare the first pixel values PX1 and the second pixel values PX2 of the image data IDAT in a specific area to estimate the motion information MI in the specific area. In detail, the motion estimation module 220 may correct pixel values such that the first pixel values PX1 and the second pixel values PX2 have the same luminance. After the correction, the motion estimation module 220 may estimate the motion information MI based on a difference between the first pixel values PX1 and the second pixel values PX2. Accordingly, the motion estimation module 220 may estimate the motion information MI based on the first pixel values PX1 and the second pixel values PX2. However, the inventive concepts are not limited thereto. For example, the motion estimation module 220 may estimate the motion information MI based on various methods.

In some example embodiments, in the case where a motion detection sensor detecting a movement of an object exists (e.g., the imaging system includes a motion detection sensor that generates sensing information associated with the object), the motion estimation module 220 may estimate the motion information MI further based on sensing information output from (e.g., generated by) the motion detection sensor. In some example embodiments, the motion information MI may be estimated based on the image data IDAT and the sensing information. The motion information MI may be provided to the Bayer image generation block 230 and the image reconstruction module 240.

The Bayer image generation block 230 may generate a Bayer image BI based on pixel values PX. The Bayer image BI may be an image having a Bayer pattern as illustrated in FIG. 3C.

The first Bayer image generation module 231 may generate a first Bayer image BI1 based on the first pixel values PX1 (e.g., based on the separate first pixel values). For example, the first Bayer image generation module 231 may generate the first Bayer image BI1 by generating an interpolation image by using the first pixel values PX1 and converting the interpolation image to a Bayer pattern, such that the first Bayer image BI1 is generated based on the first pixel values PX1. Restated, the first Bayer image generation module 231 may generate the first Bayer image BI1 based on interpolating pixel values based on the first pixel values PX1 (e.g., the separated first pixel values) to generate an interpolation image and further converting the interpolation image to a Bayer pattern. The first Bayer image BI1 may include only pixel values corresponding to the first exposure time (e.g., may include and/or be based on only the first pixel values PX1).

In some example embodiments, the first Bayer image generation module 231 may additionally use the second pixel values PX2 and the motion information MI for the purpose of generating the first Bayer image BI1, such that the first Bayer image BI1 is generated based on both the first pixel values PX1 and the second pixel values PX2. In some example embodiments, the first Bayer image generation module 231 may determine a weight of the first pixel values PX1 and a weight of the second pixel values PX2 based on the motion information MI. The first Bayer image generation module 231 may generate the first Bayer image BI1 using the first pixel values PX1 and the second pixel values PX2 based on the weights.

The second Bayer image generation module 232 may generate a second Bayer image BI2 based on the second pixel values PX2 and the first Bayer image BI1. For example, the second Bayer image generation module 232 may interpolate pixel values of the second Bayer image BI2 by using the second pixel values PX2 and pixel values of the first Bayer image BI1. In some example embodiments, pixel values of the first Bayer image BI1 may be referred to as third pixel values of the first Bayer image BI1, such that the second Bayer image is generated based on both the second pixel values PX2 (e.g., the separated second pixel values) and third pixel values of the first Bayer image BI1. The second Bayer image generation module 232 may interpolate the pixel values of the second Bayer image BI2 based on the weight of the second pixel values PX2 and the pixel values of the first Bayer image BI1. The weight of the second pixel values PX2 (e.g., a first weight of the second pixel values PX2) and a weight of the pixel values of the first Bayer image BI1 (e.g., a second weight of the third pixel values of the first Bayer image BI1) may be determined by the second Bayer image generation module 232, to generate pixel values of the second Bayer image BI2, based on the motion information MI. Accordingly, pixel values of the second Bayer image BI2 may be generated based on the weight of the second pixel values PX2 and the weight of the pixel values of the first Bayer image BI1. For example, in an area where a value of the motion information MI is large, the weight of the second pixel values PX2 may be determined to be larger than the weight of the pixel values of the first Bayer image BI1. The second Bayer image BI2 may include only pixel values corresponding to the second exposure time. In some example embodiments, the second Bayer image generation module 232 may additionally use the first pixel values PX1 for the purpose of generating the second Bayer image BI2.

The image reconstruction module 240 may generate the HDR image HDAT based on the first and second Bayer images BI1 and BI2. For example, the image reconstruction module 240 may combine the first Bayer image BI1 and the second Bayer image BI2 based on the weight of the first Bayer image BI1 and the weight of the second Bayer image BI2. The respective weights may be determined based on the motion information MI. Accordingly the first Bayer image BI1 and the second Bayer image BI2 may be combined based on the motion information MI to generate the HDR image HDAT. For example, in an area where a value of the motion information MI is large, the weight of the first Bayer image BI1 may be determined to be smaller than the weight of the pixel values of the second Bayer image BI2.

As described above, the processing device 200 according to some example embodiments of the inventive concepts may generate the first Bayer image BI1 based on first pixel values PX1 corresponding to the first exposure time. Because the number of pixels corresponding to the first pixel values PX1 is more than the number of pixels corresponding to the second pixel values PX2, the first Bayer image BI1 that is generated based on the first pixel values PX1 may have relatively high sharpness. The sharpness of the second Bayer image BI2 that is generated based on the first Bayer image BI1 may also be relatively high. As such, the sharpness of the HDR image HDAT that is generated based on the first Bayer image BI1 and the second Bayer image BI2 may be relatively high. That is, the quality of the HDR image HDAT may be improved. Also, the processing device 200 may generate the Bayer images BI1 and BI2 and the HDR image HDAT based on the motion information MI of an object. Accordingly, the probability that artifacts occur in the HDR image HDAT due to a movement of an object may decrease.

Figure 7:
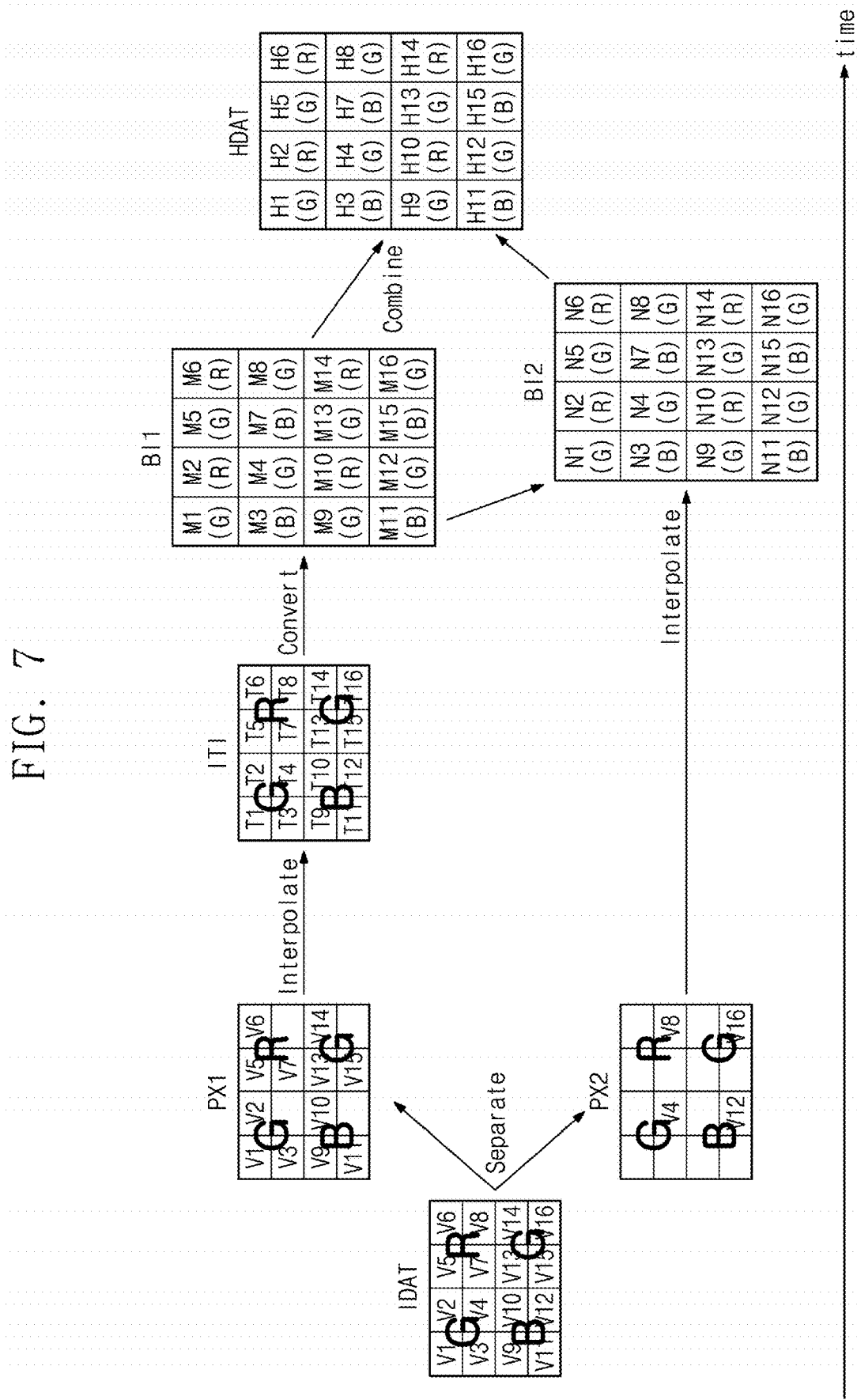
FIG. 7 is a diagram illustrating example images generated according to an operation of a processing device of FIG. 6.

FIG. 7 is a diagram illustrating example images generated according to an operation of the processing device 200 of FIG. 6. Referring to FIGS. 6 and 7, the processing device 200 may generate various image data based on the image data IDAT over time.

The pattern separation module 210 may receive the image data IDAT. The image data IDAT may include pixel values V1 to V16 obtained from the pixels P1 to P16 having the CFA pattern of FIG. 3A. The pixel values V1 to V16 may be obtained based on the exposure pattern of FIG. 4A. Here, the pixel values V1 to V16 may be pixel values of the pixels P1 to P16.

The pattern separation module 210 may separate the first pixel values PX1 and the second pixel values PX2 from the image data IDAT. The first pixel values PX1 may include 12 pixel values corresponding to the first exposure time, and the second pixel values PX2 may include 4 pixel values corresponding to the second exposure time.

The first Bayer image generation module 231 may generate an interpolation image ITI based on the first pixel values PX1. The first Bayer image generation module 231 may interpolate pixel values T1 to T16 of the interpolation image ITI by using the first pixel values PX1. Here, the pixel values T1 to T16 may be pixel values of positions corresponding to the pixels P1 to P16.

The first Bayer image generation module 231 may convert the interpolation image ITI to generate the first Bayer image BI1 having the Bayer pattern. In some example embodiments, pixel values M1 to M16 of the first Bayer image BI1 may correspond to the first exposure time. Here, the pixel values M1 to M16 may be pixel values of the positions corresponding to the pixels P1 to P16.

The second Bayer image generation module 232 may generate the second Bayer image BI2 based on the second pixel values PX2 and the pixel values M1 to M16 of the first Bayer image BI1. The second Bayer image generation module 232 may interpolate pixel values N1 to N16 of the second Bayer image BI2 such that the second Bayer image BI2 has the Bayer pattern. Here, the pixel values N1 to N16 may be pixel values of the positions corresponding to the pixels P1 to P16. In some example embodiments, the pixel values N1 to N16 of the second Bayer image BI2 may correspond to the second exposure time.

An example is illustrated in FIG. 7 as the second Bayer image BI2 is generated directly through interpolation, but the inventive concepts are not limited thereto. For example, like the first Bayer image BI1, the second Bayer image BI2 may be generated by generating an interpolation image through interpolation and converting the interpolation image to a Bayer pattern.

The image reconstruction module 240 may combine the first Bayer image BI1 and the second Bayer image BI2 to generate pixel values H1 to H16 of the HDR image HDAT. As such, the HDR image HDAT of the Bayer pattern may be generated.

As illustrated in FIG. 7, resolutions of the first Bayer image BI1 and the second Bayer image BI2 may be the same as a resolution of the image data IDAT. The resolution of the image data IDAT may be the same as the total number ("quantity") of pixels of the pixel array 121. That is, a resolution of the first Bayer image BI1 and a resolution of the second Bayer image BI2 may be the same as a resolution of the image sensor 120. Also, a resolution of the HDR image HDAT that is generated from the first Bayer image BI1 and the second Bayer image BI2 may be the same as a resolution of the image sensor 120. Accordingly, the processing device 200 may generate the HDR image HDAT of a high resolution without a decrease in a resolution.

Figure 8:
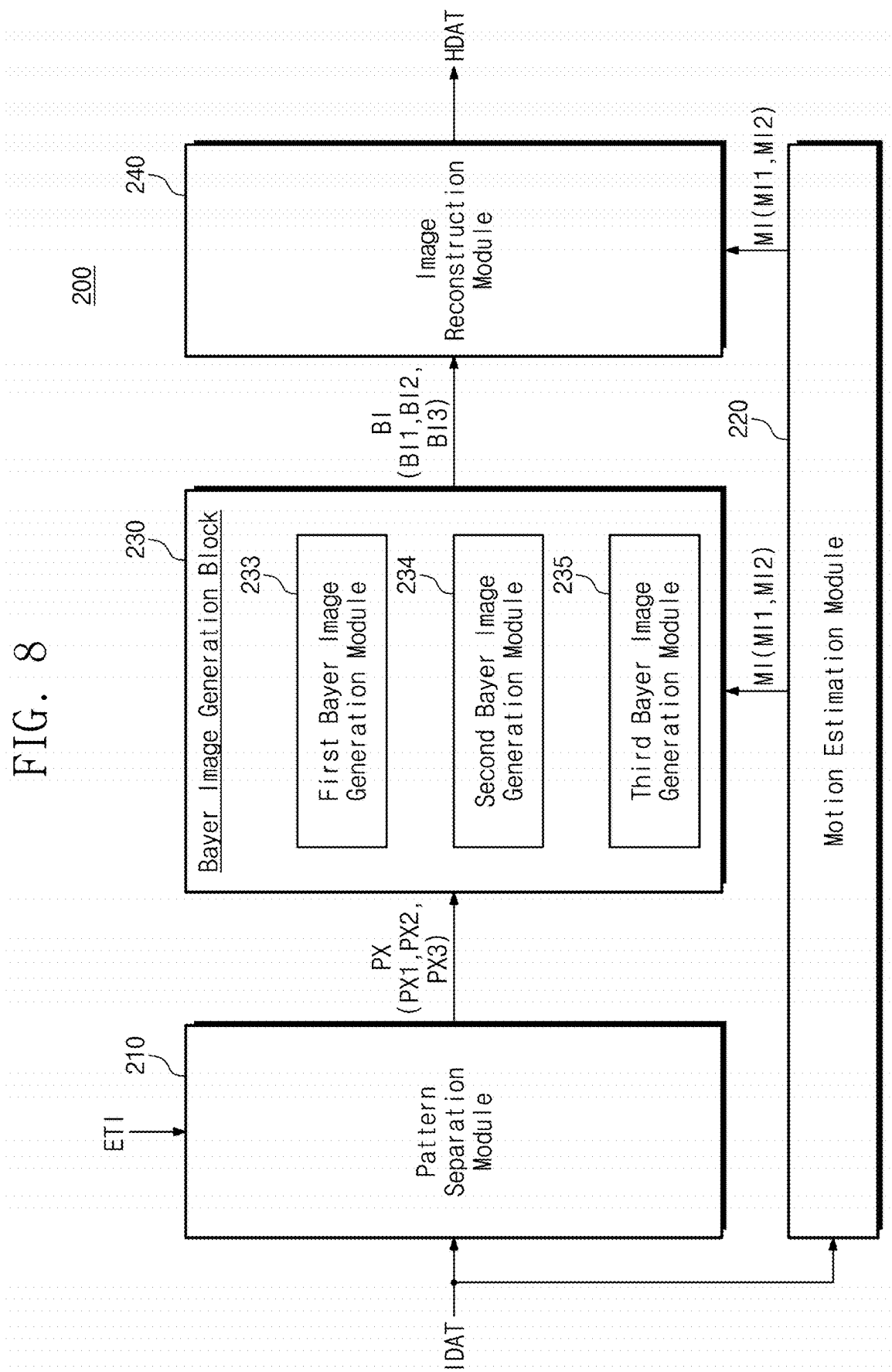
FIG. 8 is a block diagram illustrating one example of a processing device of FIG. 2.

FIG. 8 is a block diagram illustrating one example of the processing device 200 of FIG. 2. In detail, FIG. 8 shows the processing device 200 that generates the HDR image HDAT based on the image data IDAT obtained by using three exposure times. Referring to FIG. 8, the processing device 200 may include the pattern separation module 210, the motion estimation module 220, the Bayer image generation block 230, and the image reconstruction module 240. The Bayer image generation block 230 may include a first Bayer image generation module 233, a second Bayer image generation module 234, and a third Bayer image generation module 235.

Operations of the pattern separation module 210, the motion estimation module 220, the Bayer image generation block 230, and the image reconstruction module 240 of FIG. 8 may be substantially the same as or similar to the operations of the pattern separation module 210, the motion estimation module 220, the Bayer image generation block 230, and the image reconstruction module 240 of FIG. 6, and thus, additional description will be omitted to avoid redundancy.

The pattern separation module 210 may separate first pixel values PX1 corresponding to a first exposure time, second pixel values PX2 corresponding to a second exposure time, and third pixel values PX3 corresponding to a third exposure time from the image data IDAT based on the exposure time information ETI. The number of pixels corresponding to the first pixel values PX1 may be more than the number of pixels corresponding to the third pixel values PX3. The number of pixels corresponding to the second pixel values PX2 may be not more than the number of pixels corresponding to the first pixel values PX1 and may be not less than the number of pixels corresponding to the third pixel values PX3. That is, pixel counts corresponding to the pixel values PX (e.g., the first pixel values PX1, the second pixel values PX2, and the third pixel values PX3) may be different from each other, or pixel counts corresponding to two pixel values (e.g., the first pixel values PX1 and the second pixel values PX2) may be the same as each other and may be different from a pixel count corresponding to the remaining pixel values PX (e.g., the third pixel values PX3). The separated pixel values PX may be provided to the Bayer image generation block 230.

The motion estimation module 220 may estimate motion information MI based on the image data IDAT. The motion information MI may include first motion information MI1 and second motion information MI2. The first motion information MI1 may be estimated based on the first pixel values PX1 and the second pixel values PX2 of the image data IDAT, and the second motion information MI2 may be estimated based on the second pixel values PX2 and the third pixel values PX3 of the image data IDAT. The motion estimation module 220 may provide the motion information MI to the Bayer image generation block 230 and the image reconstruction module 240.

The first Bayer image generation module 233 may generate a first Bayer image BI1 based on the first pixel values PX1. For example, the first Bayer image generation module 233 may generate the first Bayer image BI1 by generating an interpolation image by using the first pixel values PX1 and converting the interpolation image to a Bayer pattern. The first Bayer image BI1 may include only pixel values corresponding to the first exposure time.

In some example embodiments, the first Bayer image generation module 233 may additionally use the second pixel values PX2 and the first motion information MI1 for the purpose of generating the first Bayer image BI1. In some example embodiments, the first Bayer image generation module 233 may determine a weight of the first pixel values PX1 and a weight of the second pixel values PX2 based on the first motion information MIL The first Bayer image generation module 233 may generate the first Bayer image BI1 using the first pixel values PX1 and the second pixel values PX2 based on the weights.

The second Bayer image generation module 234 may generate a second Bayer image BI2 based on the second pixel values PX2 and the first Bayer image BI1. For example, the second Bayer image generation module 234 may interpolate pixel values of the second Bayer image BI2 by using the second pixel values PX2 and pixel values of the first Bayer image BI1. The second Bayer image generation module 234 may interpolate the pixel values of the second Bayer image BI2 based on the weight of the second pixel values PX2 and the weight of the pixel values of the first Bayer image BI1. The weight of the second pixel values PX2 and a weight of the pixel values of the first Bayer image BI1 may be determined based on the first motion information MIL For example, in an area where a value of the first motion information MI1 is large, the weight of the second pixel values PX2 may be determined to be larger than the weight of the pixel values of the first Bayer image BI1. The second Bayer image BI2 may include only pixel values corresponding to the second exposure time. In some example embodiments, the second Bayer image generation module 234 may additionally use the first pixel values PX1 for the purpose of generating the second Bayer image BI2.

The third Bayer image generation module 235 may generate a third Bayer image BI3 based on the third pixel values PX3 and the second Bayer image BI2. For example, the third Bayer image generation module 235 may interpolate pixel values of the third Bayer image BI3 by using the third pixel values PX3 and pixel values of the second Bayer image BI2. The third Bayer image generation module 235 may interpolate the pixel values of the third Bayer image BI3 based on the weight of the third pixel values PX3 and a weight of the pixel values of the second Bayer image BI2. The weight of the second pixel values PX3 and the weight of the pixel values of the second Bayer image BI2 may be determined based on second motion information MI2. For example, in an area where a value of the second motion information MI2 is large, the weight of the third pixel values PX3 may be determined to be larger than the weight of the pixel values of the second Bayer image BI2. The third Bayer image BI3 may include only pixel values corresponding to the third exposure time. In some example embodiments, the third Bayer image generation module 235 may additionally use the second pixel values PX2 for the purpose of generating the third Bayer image BI3.

The image reconstruction module 240 may generate the HDR image HDAT based on the first to third Bayer images BI1 to BI3. For example, the image reconstruction module 240 may combine the first to third Bayer images BI1 to BI3 based on the weight of the first Bayer image BI1, the weight of the second Bayer image BI2 and a weight of the third Bayer image BI3. The respective weights may be determined based on the first motion information MI1 and the second motion information MI2.

As described above, the processing device 200 according to some example embodiments of the inventive concepts may sequentially generate Bayer images respectively corresponding to exposure times by using a previously generated Bayer image. The processing device 200 may generate the HDR image HDAT by using Bayer images corresponding to various exposure times. As such, the processing device 200 may generate the HDR image HDAT of finely adjusted brightness.

Figure 9:
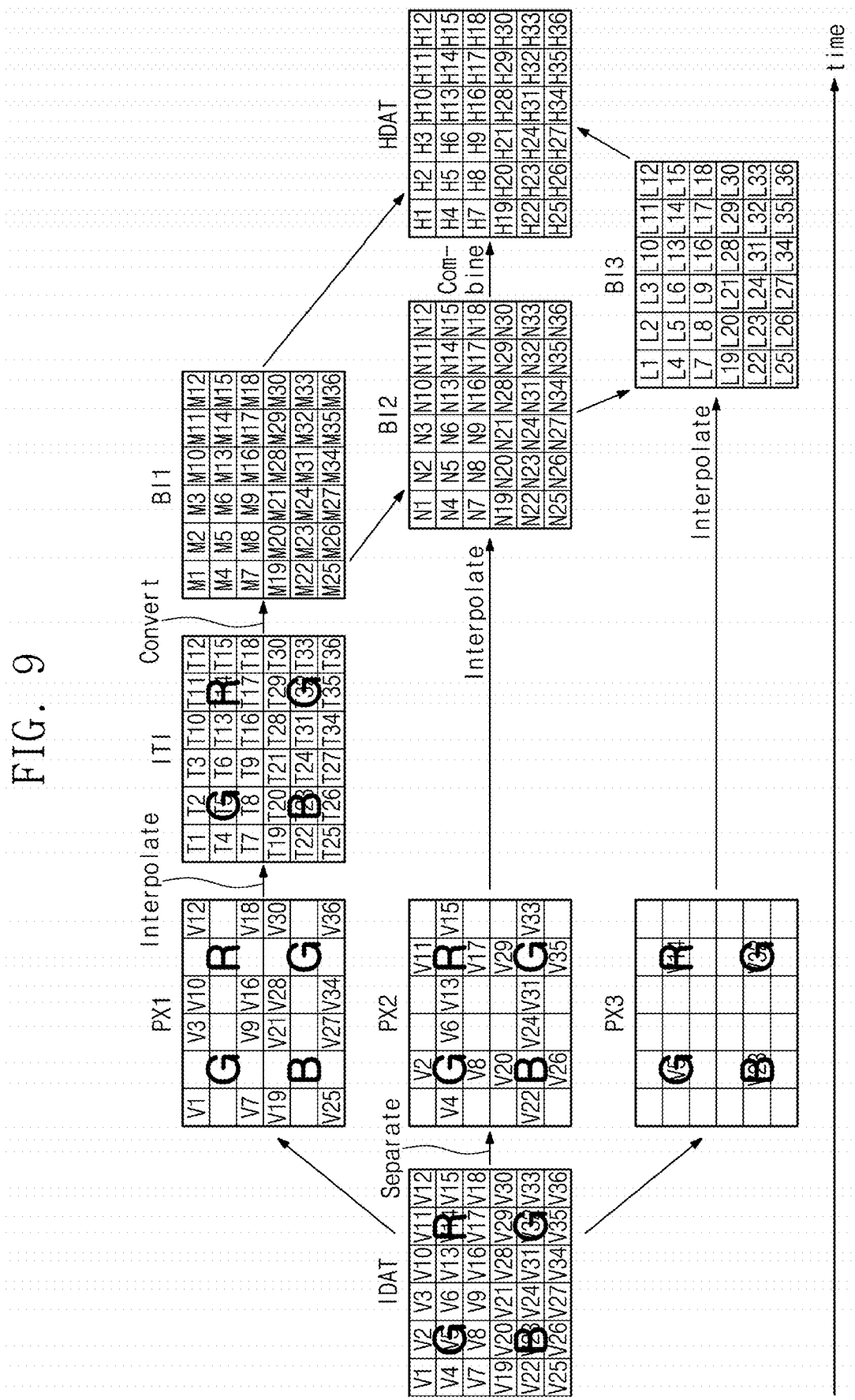
FIG. 9 is a diagram illustrating example images generated according to an operation of a processing device of FIG. 8.

FIG. 9 is a diagram illustrating example images generated according to an operation of the processing device 200 of FIG. 8. Referring to FIGS. 8 and 9, the processing device 200 may generate various image data based on the image data IDAT over time.

The pattern separation module 210 may receive the image data IDAT. The image data IDAT may include pixel values V1 to V36 obtained from the pixels P1 to P36 having the CFA pattern of FIG. 3B. The pixel values V1 to V36 may be obtained based on the exposure pattern of FIG. 4C. Here, the pixel values V1 to V36 may be pixel values of the pixels P1 to P36.

The pattern separation module 210 may separate the first pixel values PX1, the second pixel values PX2, and the third pixel values PX3 from the image data IDAT. The first pixel values PX1 may include 16 pixel values corresponding to the first exposure time, the second pixel values PX2 may include 16 pixel values corresponding to the second exposure time, and the third pixel values PX3 may include 4 pixel values corresponding to the third exposure time.

The first Bayer image generation module 233 may generate the interpolation image ITI based on the first pixel values PX1. The first Bayer image generation module 233 may interpolate pixel values T1 to T36 of the interpolation image ITI by using the first pixel values PX1. Here, the pixel values T1 to T36 may be pixel values of positions corresponding to the pixels P1 to P36.

The first Bayer image generation module 233 may convert the interpolation image ITI to generate the first Bayer image BI1 having the Bayer pattern. In some example embodiments, pixel values M1 to M36 of the first Bayer image BI1 may correspond to the first exposure time. Here, the pixel values M1 to M36 may be pixel values of the positions corresponding to the pixels P1 to P36.

The second Bayer image generation module 234 may generate the second Bayer image BI2 based on the second pixel values PX2 and the pixel values M1 to M36 of the first Bayer image BI1. The second Bayer image generation module 234 may interpolate pixel values N1 to N36 of the second Bayer image BI2 such that the second Bayer image BI2 has the Bayer pattern. Here, the pixel values N1 to N36 may be pixel values of the positions corresponding to the pixels P1 to P36. In some example embodiments, the pixel values N1 to N36 of the second Bayer image BI2 may correspond to the second exposure time.

The third Bayer image generation module 235 may generate the third Bayer image BI3 based on the third pixel values PX3 and the pixel values N1 to N36 of the second Bayer image BI2. The third Bayer image generation module 235 may interpolate pixel values L1 to L36 of the third Bayer image BI3 such that the third Bayer image BI3 has the Bayer pattern. Here, the pixel values L1 to L36 may be pixel values of the positions corresponding to the pixels P1 to P36. In some example embodiments, the pixel values L1 to L36 of the third Bayer image BI3 may correspond to the third exposure time.

An example is illustrated in FIG. 9 as the second Bayer image BI2 and the third Bayer image BI3 are generated directly through interpolation, but the inventive concepts are not limited thereto. For example, like the first Bayer image BI1, the second Bayer image BI2 and the third Bayer image BI3 may be generated by generating interpolation images through interpolation and converting the interpolation images to the Bayer pattern.

The image reconstruction module 240 may combine the first Bayer image BI1, the second Bayer image BI2, and the third Bayer image BI3 to generate pixel values H1 to H36 of the HDR image HDAT. As such, the HDR image HDAT of the Bayer pattern may be generated.

As illustrated in FIG. 9, resolutions of the first Bayer image BI1, the second Bayer image BI2, and the third Bayer image BI3 may be the same as a resolution of the image data IDAT. The resolution of the image data IDAT may be the same as the number of pixels of the pixel array 121. That is, the resolutions of the first to third Bayer images BI1 to BI3 may be the same as a resolution of the image sensor 120. A resolution of the HDR image HDAT that is generated from the first to third Bayer images BI1 to BI3 may be the same as the resolution of the image sensor 120. Accordingly, the processing device 200 may generate the HDR image HDAT of a high resolution without a decrease in a resolution.

Below, for convenience of description, operations of the processing device 200 according to some example embodiments of the inventive concepts will be described with reference to the processing device 200 of FIG. 6.

Figure 10:
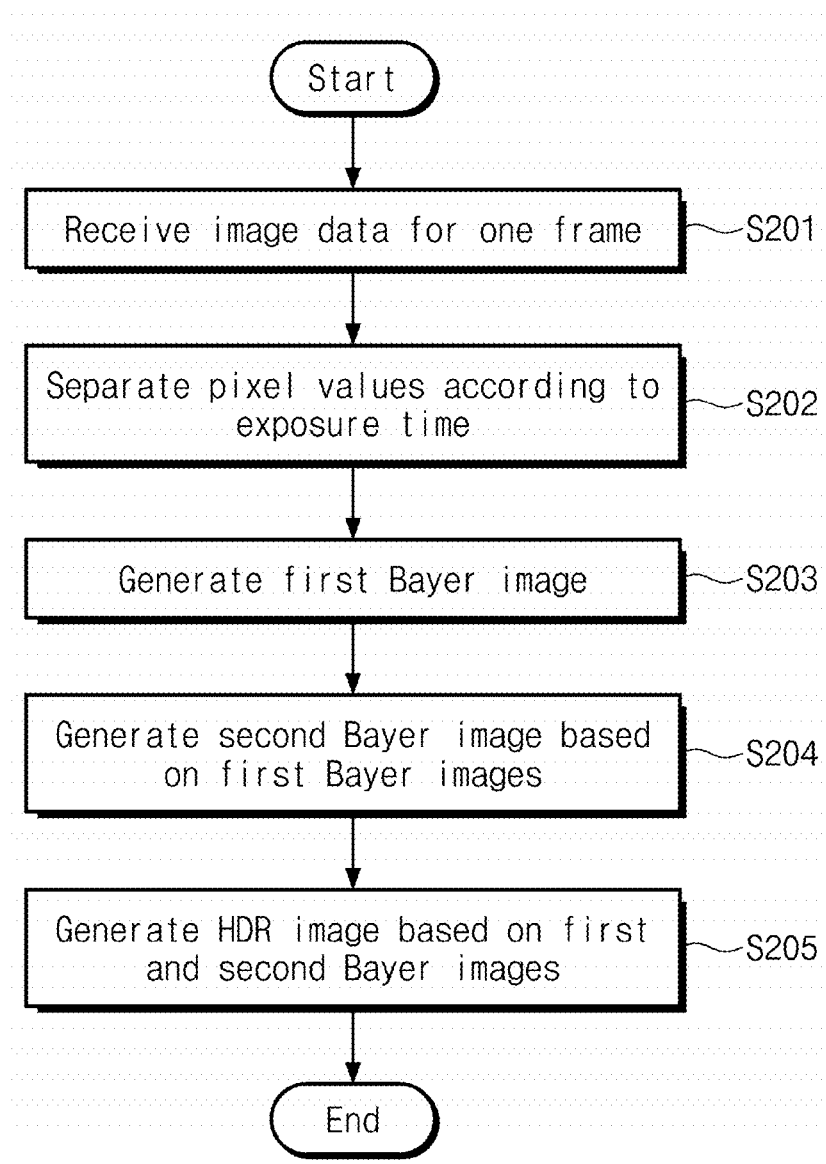
FIG. 10 is a flowchart illustrating an operation in which a processing device of FIG. 6 generates an HDR image.

FIG. 10 is a flowchart illustrating an operation in which the processing device 200 of FIG. 6 generates an HDR image. Referring to FIGS. 6 and 10, in operation S201, the processing device 200 may receive the image data IDAT for one frame. As shown in at least FIG. 7, one frame of an image generated by the pixel array 121 may include both first pixel values PX1 and second pixel values PX2, such that the first pixel values PX1 and the second pixel values PX2 may be obtained from a common frame of an image generated by the pixel array 121. The image data IDAT may be obtained from the image sensor 120. In operation S202, the processing device 200 may separate pixel values of the image data IDAT based on an exposure time. The processing device 200 may separate the first pixel values PX1 and the second pixel values PX2.

In operation S203, the processing device 200 may generate the first Bayer image BI1 based on the first pixel values PX1. In operation S204, the processing device 200 may generate the second Bayer image BI2 based on the first Bayer image BI1. The processing device 200 may additionally use the second pixel values PX2 for the purpose of generating the second Bayer image BI2. In operation S205, the processing device 200 may generate the HDR image HDAT based on the first and second Bayer images BI1 and BI2.

Figure 11:
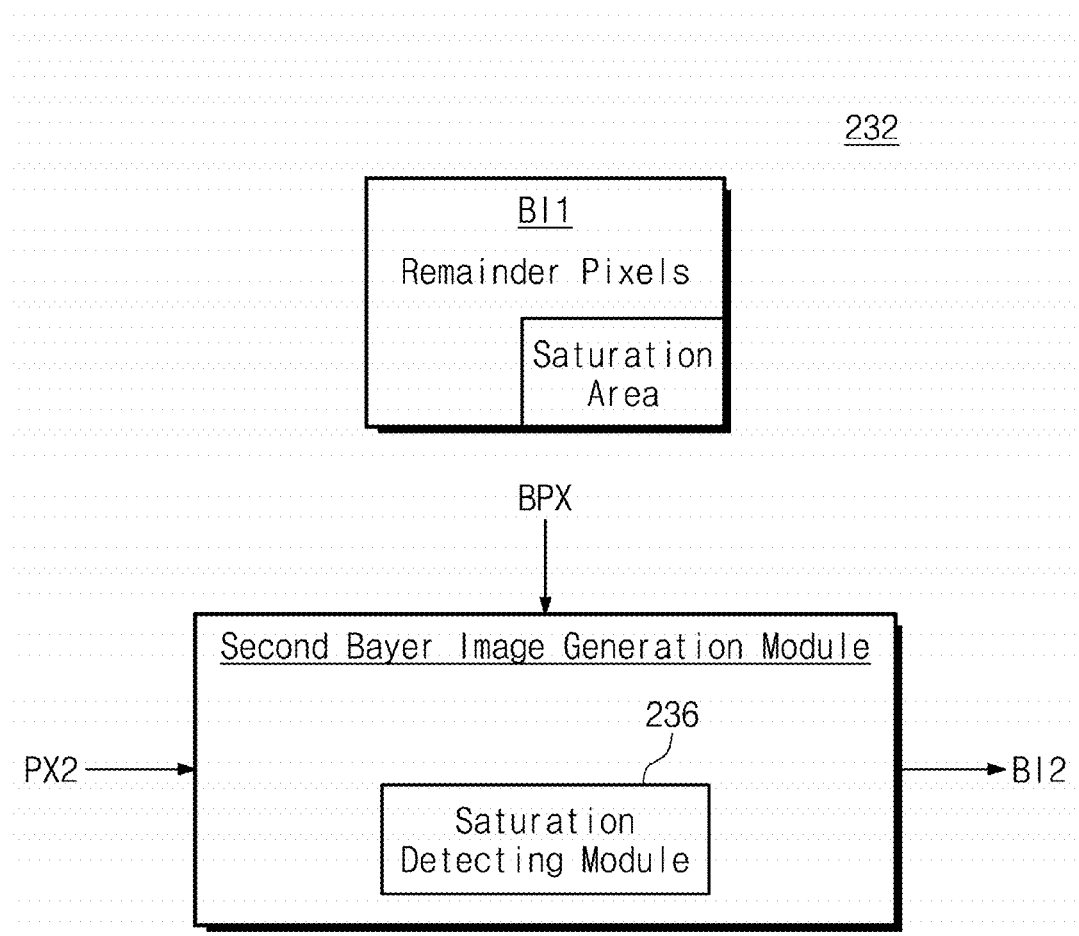
FIG. 11 is a block diagram illustrating an example additional operation of a second Bayer image generation module of FIG. 6.

FIG. 11 is a block diagram illustrating an example additional operation of the second Bayer image generation module 232 of FIG. 6. Referring to FIG. 11, the second Bayer image generation module 232 may receive the second pixel values PX2 and pixel values BPX of the first Bayer image BI1.

The second Bayer image generation module 232 may include a saturation detecting module 236. The saturation detecting module 236 may detect a saturation area of the first Bayer image BI1. The saturation area may include one or more saturated pixels. Thus, the saturation detecting module 236 may determine that a saturation area including one or more saturated pixels is present in the first Bayer image BI1. A saturated pixel may be a pixel having a distorted color value. For example, the saturation detecting module 236 may determine a saturated pixel based on whether a color value of each of the pixel values BPX exceeds a threshold value. Here, the threshold value may be a reference value that is used to determine a saturated pixel. The saturation detecting module 236 may detect a saturation area based on a saturated pixel and may generate saturation information.

The second Bayer image generation module 232 may determine a weight of the pixel values BPX for generating the second Bayer image BI2 by using the saturation information of the first Bayer image BI1. For example, the second Bayer image generation module 232 may determine the weight of the pixel values BPX of the saturation area as "0". In some example embodiments, the second Bayer image generation module 232 may generate pixel values of the second Bayer image BI2 without using the pixel values BPX of the saturation area. Restated, the second Bayer image generation module 232 may generate pixel values of the second Bayer image BI2 based on remaining pixel values of the third pixel values of the remainder pixels of the first Bayer image BI1 that exclude pixel values of the one or more saturated pixels of the saturation area, in response to the determination that the saturation area including the one or more saturated pixels is present in the first Bayer image BI1.

As described above, the processing device 200 according to some example embodiments of the inventive concepts may use the saturation information of the first Bayer image BI1 as well as the motion information MI, for the purpose of generating the second Bayer image BI2. In the case where the saturation information is used, the processing device 200 may generate the HDR image HDAT except for the saturated pixel value. As such, the quality of the HDR image HDAT may be improved.

Figure 12:
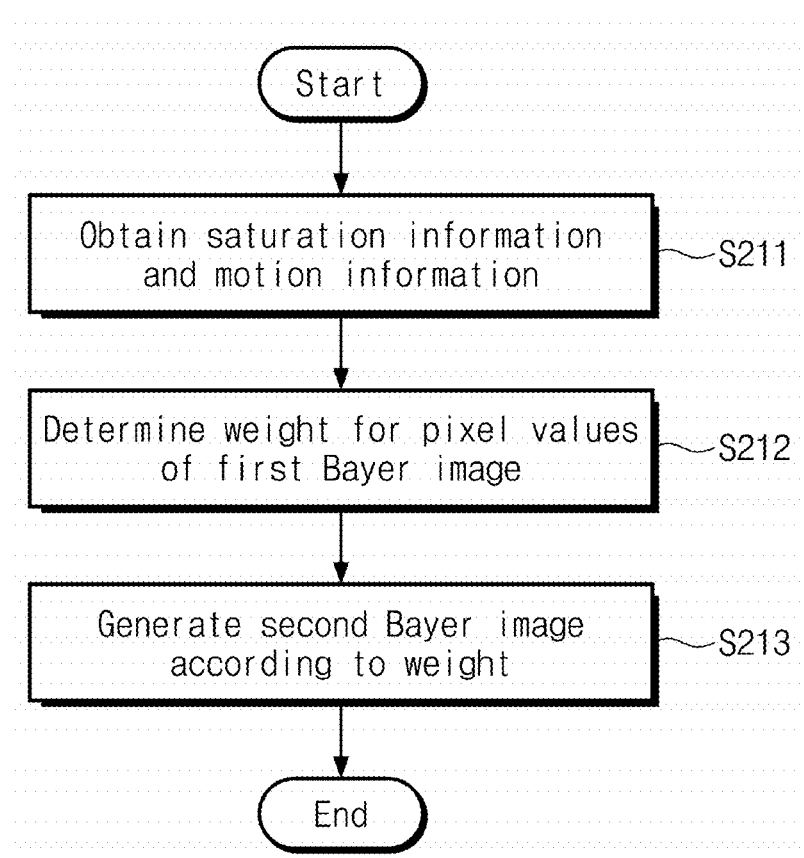
FIG. 12 is a flowchart illustrating an operation in which a processing device of FIG. 6 generates a second Bayer image.

FIG. 12 is a flowchart illustrating an operation in which the processing device 200 of FIG. 6 generates the second Bayer image BI2. Referring to FIGS. 6, 11, and 12, in operation S211, the processing device 200 may obtain saturation information and the motion information MI. The processing device 200 may detect a saturation area of the first Bayer image BI1 through the saturation detecting module 236 and may obtain the saturation information. The processing device 200 may obtain the motion information MI of an object through the motion estimation module 220.

In operation S212, the processing device 200 may determine a weight for the pixel values BPX of the first Bayer image BI1. The processing device 200 may determine the weight for the pixel values BPX (e.g., the third pixel values of the first Bayer image BI1) based on the saturation information, the motion information MI, or both the saturation information and the motion information MI. For example, the processing device 200 may determine the weight of the pixel values BPX of the saturation area as "0" regardless of the motion information MI.

In operation S213, the processing device 200 may generate the second Bayer image BI2 based on the determined weight. The processing device 200 may generate the second Bayer image BI2 based on the weight of the second pixel values PX2 and the weight of the pixel values BPX of the first Bayer image BI1. The weight of the second pixel values PX2 may depend on the weight of the pixel values BPX. For example, when the weight of the pixel values BPX is decreased, the weight of the second pixel values PX2 may be increased. As such, the processing device 200 may generate the second Bayer image BI2 based on the respective weights.

Figure 13:
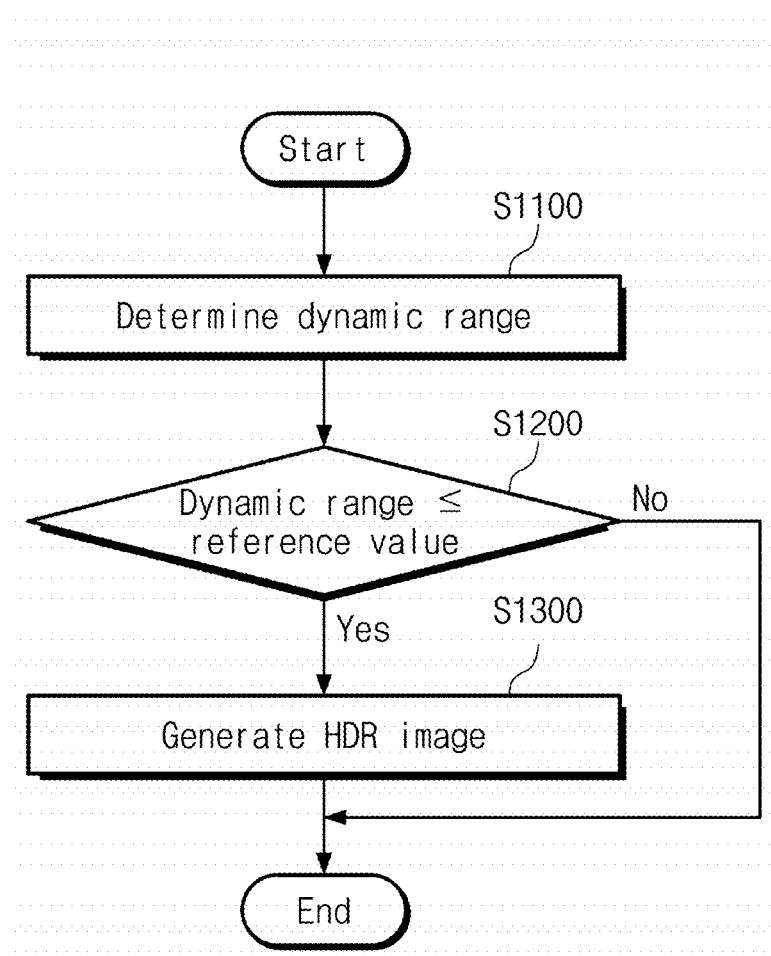
FIG. 13 is a flowchart illustrating an example operation of an imaging system of FIG. 2.

FIG. 13 is a flowchart illustrating an example operation of the imaging system 1000 of FIG. 2. Referring to FIGS. 2 and 13, in operation S1100, the imaging system 1000 may determine a dynamic range of an environment to be captured. The imaging system 1000 may determine the dynamic range based on the image data IDAT through the controller 300. For example, the controller 300 may determine the dynamic range based on statistical information of the image data IDAT. In operation S1200, the imaging system 1000 may determine whether the dynamic range is not larger than a reference value. For example, the reference value may be, but is not limited to, 84 dB.

When the dynamic range is not larger than the reference value, in operation S1300, the imaging system 1000 may generate the HDR image HDAT according to the inventive concepts. That is, the HDR image HDAT may be generated as described with reference to FIGS. 1 to 12. For example, the imaging system 1000 may adjust an exposure time for each pixel to form the exposure pattern of FIG. 4A, 4B, or 4C. The imaging system 1000 may obtain the image data IDAT for one frame based on the exposure pattern. The imaging system 1000 may sequentially generate Bayer images respectively corresponding to exposure times, based on the image data IDAT. In some example embodiments, the imaging system 1000 may generate a next Bayer image by using a previously generated Bayer image. The imaging system 1000 may generate the HDR image HDAT based on the Bayer images.

When the dynamic range is larger than the reference value, the imaging system 1000 may generate the HDR image HDAT by using a different method from the inventive concepts. For example, the imaging system 1000 may form an exposure pattern or may process the image data IDAT in a different manner from the inventive concepts.

As described above, the imaging system 1000 may select a way to process the image data IDAT for generating the HDR image HDAT based on a dynamic range of an environment to be captured.

Figure 14:
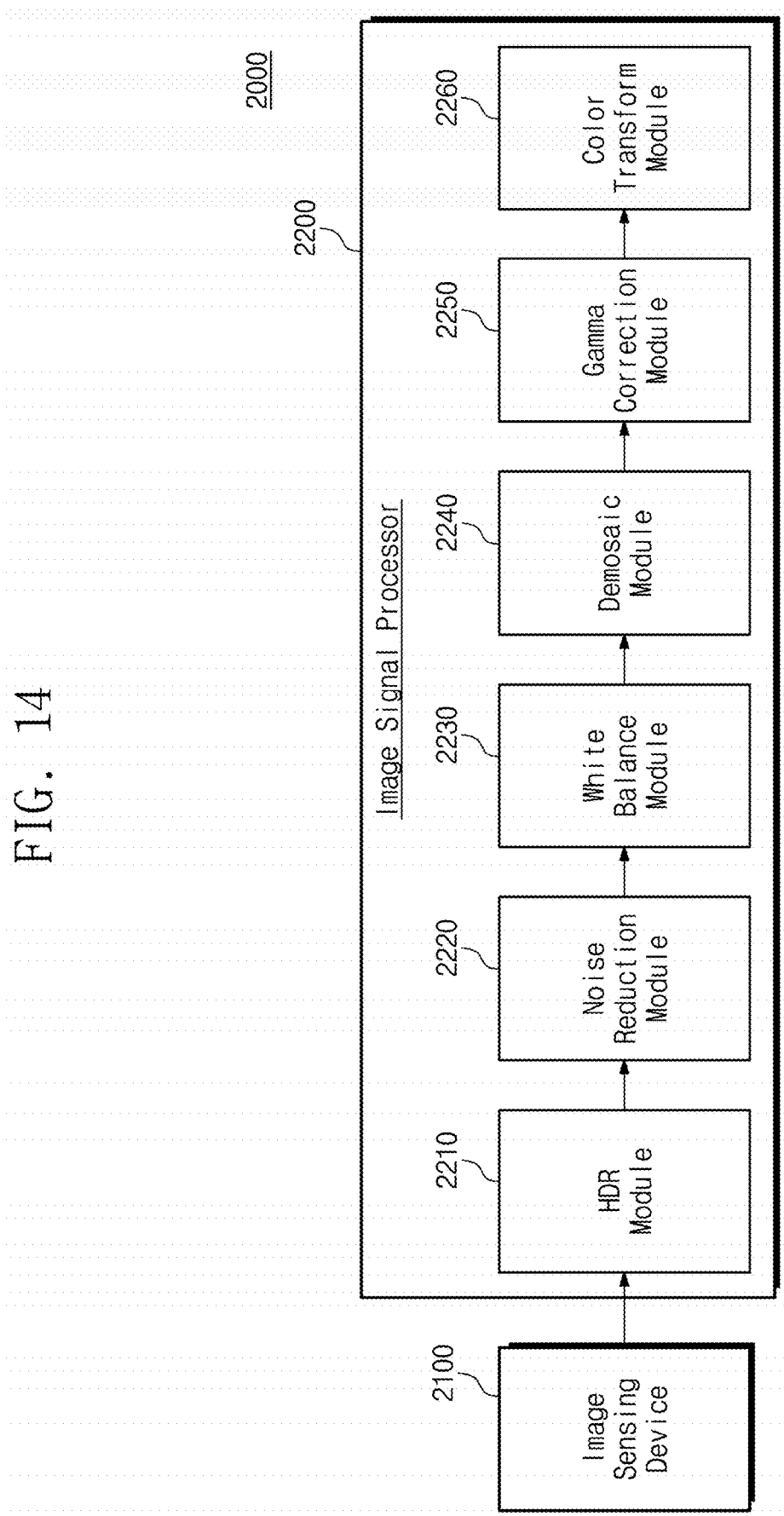
FIG. 14 is a block diagram illustrating one example to which an imaging system according to some example embodiments of the inventive concepts is applied.

FIG. 14 is a block diagram illustrating one example to which an imaging system according to some example embodiments of the inventive concepts is applied. Referring to FIG. 14, an imaging system 2000 includes an image sensing device 2100 and an image signal processor 2200. The image sensing device 2100 may include an image sensor 120 and thus may obtain image data IDAT as described herein according to any example embodiments described herein and may provide the obtained image data IDAT to the image signal processor 2200. The image signal processor 2200 may include a HDR module 2210, a noise reduction module 2220, a white balance module 2230, a demosaic module 2240, a gamma correction module 2250, and a color transform module 2260. The image sensing device 2100 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The image signal processor 2200, including one or more of the modules included therein, may be referred to as "image signal processing circuitry" and may be implemented by processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The HDR module 2210 may generate an HDR image from image data IDAT from the image sensing device 2100. The HDR module 2210 may include the function of the processing device 200 described with reference to FIGS. 1 to 13. For example, the HDR module 2210 may sequentially generate Bayer images respectively corresponding to exposure times based on the image data and may generate the HDR image based on the Bayer images. For example, the HDR module 2210 may generate an HDR image based on a first Bayer image BI1 and a second Bayer image BI2, where the first Bayer image BI1 is generated based on first pixels values PX1 of the first pixels P1 and the second Bayer image BI2 is generated based on second pixel values PX2 of the second pixels P2 and third pixel values of the first Bayer image BI1. As such, a high-resolution and high-quality HDR image may be generated without a decrease in the resolution. In some example embodiments, a quantity of pixels of the first pixels P1 is greater than a quantity of pixels of the second pixels P2.

The noise reduction module 2220 may be configured to reduce a noise of raw data from the HDR module 2210. The white balance module 2230 may adjust a white balance gain with respect to the noise-reduced data.

The demosaic module 2240 may be configured to convert an output of the white balance module 2230 to full-color data. For example, the output of the white balance module 2230 may have a Bayer pattern. The demosaic module 2240 may be configured to convert the Bayer pattern so as to correspond to an RGB format.

The gamma correction module 2250 may be configured to correct a gamma value for an image based on the output of the demosaic module 2240. The color transform module 2260 may be configured to transform an output of the gamma correction module 2250 so as to correspond to a specific format. For example, the output of the gamma correction module 2250 may have the RGB format. The color transform module 2260 may transform the output of the gamma correction module 2250 having the RGB format to a YUV format.

As described above, the HDR image generated through the HDR module 2210 may be post-processed through various modules. An example is illustrated in FIG. 14 as the HDR image generated from the HDR module 2210 is provided to the noise reduction module 2220, but the inventive concepts are not limited thereto. For example, the HDR module 2210 may generate an HDR image from image data, the noise of which is reduced through the noise reduction module 2220.

Figure 15:
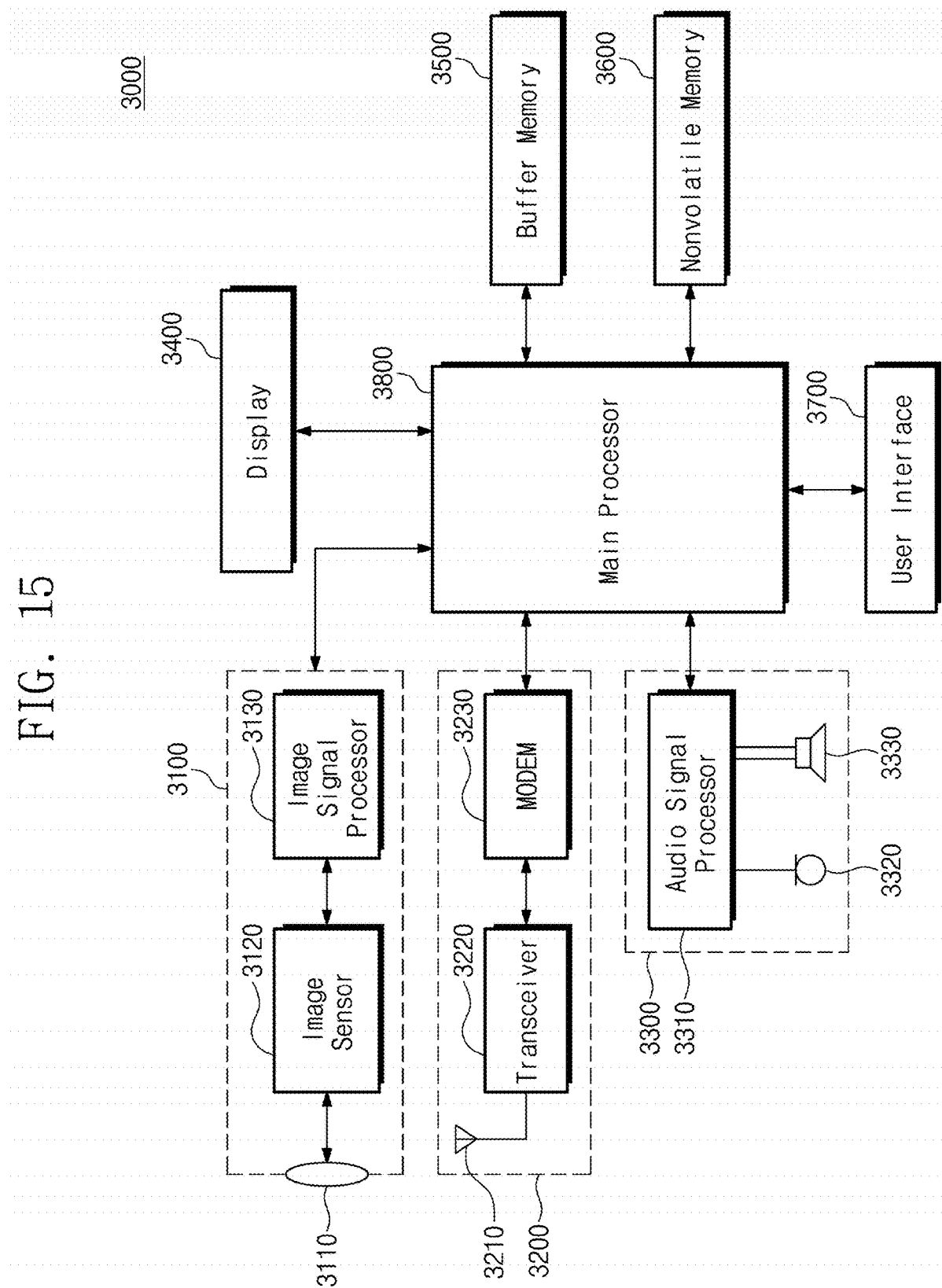
FIG. 15 is a block diagram illustrating an example to which an imaging system according to some example embodiments of the inventive concepts is applied.

FIG. 15 is a block diagram illustrating an example to which an imaging system according to some example embodiments of the inventive concepts is applied. Referring to FIG. 15, an imaging system 3000 may be implemented with various types of electronic devices. For example, the imaging system 3000 may be one of a desktop computer, a laptop computer, a tablet computer, a smartphone, a wearable device, an electric vehicle, etc. The imaging system 3000 may include an image processing block 3100, a communication block 3200, an audio processing block 3300, a display device 3400, a buffer memory 3500, a nonvolatile memory 3600, a user interface 3700, and a main processor 3800.

The image processing block 3100 may receive a light signal through a lens 3110. An image sensor 3120 and an image signal processor 3130 included in the image processing block 3100 may generate image data, based on a received light signal. For example, the image sensor 3120 may include the function of the image sensor 120 described with reference to FIGS. 1 to 13. For example, the image sensor 3120 may obtain image data based on an exposure pattern described with reference to FIG. 4A, 4B, or 4C. The image signal processor 3130 may include the function of the processing device 200 described with reference to FIGS. 1 to 13. For example, the image signal processor 3130 may sequentially generate Bayer images respectively corresponding to exposure times based on the image data and may generate an HDR image based on the Bayer images. As such, a high-resolution and high-quality HDR image may be generated without a decrease in the resolution.

The communication block 3200 may exchange signals with an external device/system through an antenna 3210. A transceiver 3220 and a MODEM Modulator/Demodulator) 3230 of the communication block 3200 may process signals, which are exchanged with the external device/system, in compliance with one or more of various wireless communication protocols.

The audio processing block 3300 may process sound information by using an audio signal processor 3310, thus playing and outputting audio. The audio processing block 3300 may receive an audio input through a microphone 3320. The audio processing block 3300 may output the played audio through a speaker 3330.

The display device 3400 may receive data from an external device (e.g., the main processor 3800) and may display an image through a display panel based on the received data. For example, the display device 3400 may display the HDR image generated from the image signal processor 3130.

The buffer memory 3500 may store data that are used for an operation of the imaging system 3000. In some example embodiments, the buffer memory 3500 may temporarily store data processed or to be processed by the main processor 3800. In some example embodiments, the buffer memory 3500 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 3600 may store data regardless of power supply. In some example embodiments, the nonvolatile memory 3600 may include at least one of various nonvolatile memories such as a flash memory, a PRAM, an MRAM, a ReRAM, and a FRAM. In some example embodiments, the nonvolatile memory 3600 may include a removable memory such as a secure digital (SD) card, and/or an embedded memory such as an embedded multimedia card (eMMC).

The user interface 3700 may perform communication arbitration between a user and the imaging system 3000. In some example embodiments, the user interface 3700 may include input interfaces such as a keypad, a button, a touch screen, a touch pad, a gyroscope sensor, a vibration sensor, and an acceleration sensor. In some example embodiments, the user interface 3700 may include output interfaces such as a motor and a LED lamp.

The main processor 3800 may control overall operations of the components of the imaging system 3000. The main processor 3800 may process various operations for the purpose of operating the imaging system 3000. For example, the main processor 3800 may be implemented with an operation processing device/circuit. As described herein, an operation processing device/circuit may include one or more processor cores, such as a general-purpose processor, a special-purpose processor, an application processor, or a microprocessor. For example, the main processor 3800 may include the function of the controller 300 described with reference to FIGS. 1 to 13. The main processor 3800 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

An imaging system according to the inventive concepts may generate an HDR image such that artifacts are reduced or minimized even though an object moves.

Also, the imaging system according to the inventive concepts may generate a high-resolution and a high-quality HDR image without a decrease in a resolution.

While the inventive concepts have been described with reference to some example embodiments thereof, it will be apparent to those of ordinary skill in the art that various changes and modifications may be made thereto without departing from the spirit and scope of the inventive concepts as set forth in the following claims.

What is claimed is:
1. An imaging system, comprising:
   a pixel array including a plurality of first pixels and a plurality of second pixels, the plurality of second pixels being separate from the plurality of first pixels;
   driver circuitry configured to
      control the plurality of first pixels based on a first exposure time, and
      control the plurality of second pixels based on a second exposure time;
   output circuitry configured to output first pixel values of the plurality of first pixels and second pixel values of the plurality of second pixels from the pixel array; and
   processing circuitry configured to generate a high dynamic range (HDR) image based on a first Bayer image and a second Bayer image, the first Bayer image generated based only on the first pixel values, the second Bayer image generated based on both the second pixel values and third pixel values of the first Bayer image;
   wherein a quantity of pixels of the first pixels is greater than a quantity of pixels of the second pixels;
   wherein the processing circuitry is further configured to
      separate the first pixel values and the second pixel values to establish separated first pixel values and separated second pixel values, respectively, based on exposure time information associated with the pixel array,
      generate the first Bayer image based only on the separated first pixel values,
      generate the second Bayer image based on both the separated second pixel values and the third pixel values of the first Bayer image,
      estimate motion information of an object based on the pixel values and the second pixel values, and determine a weight of the third pixel values to generate the second Bayer image, based on the estimated motion information.

2. The imaging system of claim 1, wherein the processing circuitry is configured to generate the first Bayer image based on
interpolating pixel values based on the separated first pixel values to generate an interpolation image, and
converting the interpolation image to a Bayer pattern.

3. The imaging system of claim 1, wherein the processing circuitry is further configured to, in response to a determination that a saturation area including one or more saturated pixels is present in the first Bayer image, generate pixel values of the second Bayer image based on remaining pixel values of the third pixel values that exclude pixel values of the one or more saturated pixels.

4. The imaging system of claim 1, further comprising:
controller circuitry configured to
determine an exposure time of the first pixels as the first exposure time, and
determine an exposure time of the second pixels as the second exposure time.

5. The imaging system of claim 4, wherein the controller circuitry is configured to determine the exposure time of the first pixels and the exposure time of the second pixels based on pixel values output from the output circuitry.

6. The imaging system of claim 1, further comprising:
a color filter array (CFA) including a plurality of color filters positioned over the pixel array,
wherein at least two adjacent color filters of the plurality of color filters are configured to selectively transmit light having a same color that is one of a red color, a green color, or a blue color.

7. The imaging system of claim 1, wherein the first pixel values and the second pixel values are obtained from a common frame of an image generated by the pixel array.

8. The imaging system of claim 1, wherein a resolution of the first Bayer image and a resolution of the second Bayer image are the same as a total quantity of pixels of the pixel array.

9. The imaging system of claim 1, wherein the first exposure time is longer than the second exposure time.

10. An imaging system, comprising:
an image sensor including a plurality of first pixels and a plurality of second pixels, the plurality of second pixels being separate from the plurality of first pixels, the image sensor configured to generate image data associated with one frame of an image based on the plurality of first pixels being controlled during a first exposure time and the plurality of second pixels being controlled during a second exposure time, the image data including first pixel values of the plurality of first pixels and second pixel values of the plurality of second pixels; and
image signal processing circuitry configured to generate an HDR image based on a first Bayer image and a second Bayer image, the first Bayer image generated based on the first pixel values, the second Bayer image generated based on both the second pixel values and third pixel values of the first Bayer image,
wherein a quantity of pixels of the first pixels is greater than a quantity of pixels of the second pixels,
wherein the image signal processing circuitry is further configured to
separate the first pixel values and the second pixel values to establish separated first pixel values and separated second pixel values, respectively, based on exposure time information associated with the image sensor,
generate the first Bayer image based only on the separated first pixel values,
generate the second Bayer image based on both the separated second pixel values and the third pixel values of the first Bayer image,
estimate motion information of an object on the first pixel values and the second pixel values, and
determine a weight of the third pixel values to generate the second Bayer image, based on the estimated motion information.

11. The imaging system of claim 10, wherein the image signal processing circuitry is configured to combine the first Bayer image and the second Bayer image based on the motion information, to generate the HDR image.

12. An operating method of an imaging system, the imaging system including an image sensor including a plurality of first pixels and a plurality of second pixels, the method comprising:
generating image data associated with one frame of an image based on the plurality of first pixels being controlled during a first exposure time and the plurality of second pixels being controlled during a second exposure time, the image data including first pixel values of the plurality of first pixels and second pixel values of the plurality of second pixels;
separating the first pixel values and the second pixel values to establish separated first pixel values and separated second pixel values, respectively, based on exposure time information associated with the image sensor;
generating a first Bayer image based only on the separated first pixel values of the first pixels of the image data;
generating a second Bayer image based on both the separated second pixel values of the second pixels of the image data and third pixel values of the first Bayer generating an HDR image based on the first Bayer image and the second Bayer image; and
estimating motion information of an object on the one frame based on the image data,
wherein a quantity of pixels of the first pixels is greater than a quantity of pixels of the second pixels,
wherein the plurality of second pixels are separate from the plurality of first pixels,
wherein the generating the second Bayer image includes
determining a first weight of the second pixel values and a second weight of the third pixel values based on the estimated motion information, and
generating pixel values of the second Bayer image based on the first weight and the second weight.

13. The method of claim 12, wherein the generating the first Bayer image includes
interpolating pixel values based on the first pixel values to generate an interpolation image; and
converting the interpolation image to a Bayer pattern.

14. The method of claim 12, wherein the generating the HDR image includes
combining the first Bayer image and the second Bayer image based on the motion information.

15. The method of claim 12, further comprising:
generating, by a motion detection sensor, sensing information associated with the object,
wherein the motion information is estimated based on the image data and the sensing information.

16. The method of claim 12, further comprising:
  detecting a saturation area, which includes one or more saturated pixels, of the first Bayer image,
  wherein the generating the second Bayer image includes generating pixel values of the second Bayer image based on remaining pixel values of the third pixel values that exclude pixel values of the one or more saturated pixels.

* * * * *